US012731343B2

(12) United States Patent
Guler et al.

(10) Patent No.: US 12,731,343 B2
(45) Date of Patent: Sep. 8, 2026

(54) UNIFYING DENSEPOSE AND 3D BODY MESH RECONSTRUCTION

(71) Applicant: Snap Inc., Santa Monica, CA (US)

(72) Inventors: Riza Alp Guler, London (GB); Antonios Kakolyris, London (GB); Iason Kokkinos, London (GB); Petros Koutras, London (GB); Eric-Tuan Le, London (GB); Georgios Papandreou, London (GB); Efstratios Skordos, London (GB); Himmy Tam, London (GB)

(73) Assignee: SNAP INC., Santa Monica, CA (US)

( * ) Notice: Subject to any disclaimer, the term of this patent is extended or adjusted under 35 U.S.C. 154(b) by 346 days.

(21) Appl. No.: 18/340,736

(22) Filed: Jun. 23, 2023

(65) Prior Publication Data

US 2024/0303937 A1 Sep. 12, 2024

(30) Foreign Application Priority Data

Mar. 8, 2023 (GR) .............................. 20230100198

(51) Int. Cl.
*G06T 19/00* (2011.01)
*G06T 7/13* (2017.01)
(Continued)

(52) U.S. Cl.
CPC .............. *G06T 19/006* (2013.01); *G06T 7/13* (2017.01); *G06T 7/73* (2017.01); *G06T 17/20* (2013.01);
(Continued)

(58) Field of Classification Search
CPC ............................... G06T 19/006; G06T 7/73; G06T 7/13; G06T 17/20; G06T 2207/20081;
(Continued)

(56) References Cited

U.S. PATENT DOCUMENTS 5,604,843 A 2/1997 Shaw et al.
5,689,559 A 11/1997 Park
(Continued)

FOREIGN PATENT DOCUMENTS

CN 109863532 A 6/2019
CN 110168478 A 8/2019
(Continued)

OTHER PUBLICATIONS

Moon et al., "Camera Distance-Aware Top-Down Approach for 3D Multi-Person Pose Estimation From a Single RGB Image," 2019 IEEE/CVF International Conference on Computer Vision (ICCV), 2019, pp. 10132-10141. (Year: 2019).*
(Continued)

*Primary Examiner* — Kent W Chang
*Assistant Examiner* — Matthew Clothier
(74) *Attorney, Agent, or Firm* — SCHWEGMAN LUNDBERG & WOESSNER, P.A.

(57) ABSTRACT

Methods and systems are disclosed for generating a 3D body mesh. The system receives an image that includes a depiction of a real-world object in a real-world environment. The system applies a first machine learning model to a portion of the image that depicts the real-world object to predict a tensor of heatmaps representing vertex positions of a plurality of triangles of a 3D mesh corresponding to the real-world object. First and second heatmaps of the tensor represent respectively first and second groups of possible coordinates for a first vertex of a first triangle of the plurality of triangles. The system generates the 3D mesh based on the selected subset of the tensor of heatmaps.

20 Claims, 13 Drawing Sheets

(51) Int. Cl.
*G06T 7/73* (2017.01)
*G06T 17/20* (2006.01)

(52) U.S. Cl.
CPC ............... *G06T 2207/20081* (2013.01); *G06T 2207/20221* (2013.01); *G06T 2207/30196* (2013.01); *G06T 2210/12* (2013.01); *G06T 2210/52* (2013.01)

(58) Field of Classification Search
CPC . G06T 2207/20221; G06T 2207/30196; G06T 2210/12; G06T 2210/52; G06T 2207/20084
See application file for complete search history.

(56) References Cited

U.S. PATENT DOCUMENTS

| | | | |
|---|---|---|---|
| 5,880,731 | A | 3/1999 | Liles et al. |
| 6,023,270 | A | 2/2000 | Brush, II et al. |
| RE36,919 | E | 10/2000 | Park |
| RE37,052 | E | 2/2001 | Park |
| 6,223,165 | B1 | 4/2001 | Lauffer |
| 6,650,793 | B1 | 11/2003 | Lund et al. |
| 6,772,195 | B1 | 8/2004 | Hatlelid et al. |
| 6,804,417 | B1 | 10/2004 | Lund et al. |
| 6,842,779 | B1 | 1/2005 | Nishizawa |
| 7,342,587 | B2 | 3/2008 | Danzig et al. |
| 7,468,729 | B1 | 12/2008 | Levinson |
| 7,636,755 | B2 | 12/2009 | Blattner et al. |
| 7,639,251 | B2 | 12/2009 | Gu et al. |
| 7,775,885 | B2 | 8/2010 | Van Luchene et al. |
| 7,859,551 | B2 | 12/2010 | Bulman et al. |
| 7,885,931 | B2 | 2/2011 | Seo et al. |
| 7,925,703 | B2 | 4/2011 | Dinan et al. |
| 8,088,044 | B2 | 1/2012 | Tchao et al. |
| 8,095,878 | B2 | 1/2012 | Bates et al. |
| 8,108,774 | B2 | 1/2012 | Finn et al. |
| 8,117,281 | B2 | 2/2012 | Robinson et al. |
| 8,130,219 | B2 | 3/2012 | Fleury et al. |
| 8,146,005 | B2 | 3/2012 | Jones et al. |
| 8,151,191 | B2 | 4/2012 | Nicol |
| RE43,993 | E | 2/2013 | Park |
| 8,384,719 | B2 | 2/2013 | Reville et al. |
| RE44,054 | E | 3/2013 | Kim |
| RE44,068 | E | 3/2013 | Park |
| RE44,106 | E | 3/2013 | Park |
| 8,396,708 | B2 | 3/2013 | Park et al. |
| RE44,121 | E | 4/2013 | Park |
| 8,425,322 | B2 | 4/2013 | Gillo et al. |
| 8,458,601 | B2 | 6/2013 | Castelli et al. |
| 8,462,198 | B2 | 6/2013 | Lin et al. |
| 8,484,158 | B2 | 7/2013 | Deluca et al. |
| 8,495,503 | B2 | 7/2013 | Brown et al. |
| 8,495,505 | B2 | 7/2013 | Smith et al. |
| 8,504,926 | B2 | 8/2013 | Wolf |
| 8,559,980 | B2 | 10/2013 | Pujol |
| 8,564,621 | B2 | 10/2013 | Branson et al. |
| 8,564,710 | B2 | 10/2013 | Nonaka et al. |
| 8,581,911 | B2 | 11/2013 | Becker et al. |
| 8,597,121 | B2 | 12/2013 | del Valle |
| 8,601,051 | B2 | 12/2013 | Wang |
| 8,601,379 | B2 | 12/2013 | Marks et al. |
| 8,632,408 | B2 | 1/2014 | Gillo et al. |
| 8,648,865 | B2 | 2/2014 | Dawson et al. |
| 8,659,548 | B2 | 2/2014 | Hildreth |
| 8,683,354 | B2 | 3/2014 | Khandelwal et al. |
| 8,692,830 | B2 | 4/2014 | Nelson et al. |
| 8,810,513 | B2 | 8/2014 | Ptucha et al. |
| 8,812,171 | B2 | 8/2014 | Filev et al. |
| 8,832,201 | B2 | 9/2014 | Wall |
| 8,832,552 | B2 | 9/2014 | Arrasvuori et al. |
| 8,839,327 | B2 | 9/2014 | Amento et al. |
| 8,890,926 | B2 | 11/2014 | Tandon et al. |
| 8,892,999 | B2 | 11/2014 | Nims et al. |
| 8,924,250 | B2 | 12/2014 | Bates et al. |
| 8,963,926 | B2 | 2/2015 | Brown et al. |
| 8,989,786 | B2 | 3/2015 | Feghali |
| 9,086,776 | B2 | 7/2015 | Ye et al. |
| 9,105,014 | B2 | 8/2015 | Collet et al. |
| 9,241,184 | B2 | 1/2016 | Weerasinghe |
| 9,256,860 | B2 | 2/2016 | Herger et al. |
| 9,298,257 | B2 | 3/2016 | Hwang et al. |
| 9,314,692 | B2 | 4/2016 | Konoplev et al. |
| 9,330,483 | B2 | 5/2016 | Du et al. |
| 9,357,174 | B2 | 5/2016 | Li et al. |
| 9,361,510 | B2 | 6/2016 | Yao et al. |
| 9,378,576 | B2 | 6/2016 | Bouaziz et al. |
| 9,402,057 | B2 | 7/2016 | Kaytaz et al. |
| 9,412,192 | B2 | 8/2016 | Mandel et al. |
| 9,460,541 | B2 | 10/2016 | Li et al. |
| 9,489,760 | B2 | 11/2016 | Li et al. |
| 9,503,845 | B2 | 11/2016 | Vincent |
| 9,508,197 | B2 | 11/2016 | Quinn et al. |
| 9,532,364 | B2 | 12/2016 | Fujito |
| 9,544,257 | B2 | 1/2017 | Ogundokun et al. |
| 9,576,400 | B2 | 2/2017 | Van Os et al. |
| 9,589,357 | B2 | 3/2017 | Li et al. |
| 9,592,449 | B2 | 3/2017 | Barbalet et al. |
| 9,648,376 | B2 | 5/2017 | Chang et al. |
| 9,697,635 | B2 | 7/2017 | Quinn et al. |
| 9,706,040 | B2 | 7/2017 | Kadirvel et al. |
| 9,744,466 | B2 | 8/2017 | Fujioka |
| 9,746,990 | B2 | 8/2017 | Anderson et al. |
| 9,749,270 | B2 | 8/2017 | Collet et al. |
| 9,792,714 | B2 | 10/2017 | Li et al. |
| 9,839,844 | B2 | 12/2017 | Dunstan et al. |
| 9,883,838 | B2 | 2/2018 | Kaleal, III et al. |
| 9,898,849 | B2 | 2/2018 | Du et al. |
| 9,911,073 | B1 | 3/2018 | Spiegel et al. |
| 9,936,165 | B2 | 4/2018 | Li et al. |
| 9,959,037 | B2 | 5/2018 | Chaudhri et al. |
| 9,980,100 | B1 | 5/2018 | Charlton et al. |
| 9,990,373 | B2 | 6/2018 | Fortkort |
| 10,039,988 | B2 | 8/2018 | Lobb et al. |
| 10,097,492 | B2 | 10/2018 | Tsuda et al. |
| 10,116,598 | B2 | 10/2018 | Tucker et al. |
| 10,155,168 | B2 | 12/2018 | Blackstock et al. |
| 10,158,589 | B2 | 12/2018 | Collet et al. |
| 10,242,477 | B1 | 3/2019 | Charlton et al. |
| 10,242,503 | B2 | 3/2019 | McPhee et al. |
| 10,262,250 | B1 | 4/2019 | Spiegel et al. |
| 10,348,662 | B2 | 7/2019 | Baldwin et al. |
| 10,362,219 | B2 | 7/2019 | Wilson et al. |
| 10,432,559 | B2 | 10/2019 | Baldwin et al. |
| 10,454,857 | B1 | 10/2019 | Blackstock et al. |
| 10,475,225 | B2 | 11/2019 | Park et al. |
| 10,504,266 | B2 | 12/2019 | Blattner et al. |
| 10,573,048 | B2 | 2/2020 | Ni et al. |
| 10,656,797 | B1 | 5/2020 | Alvi et al. |
| 10,657,695 | B2 | 5/2020 | Chand et al. |
| 10,657,701 | B2 | 5/2020 | Osman et al. |
| 10,762,174 | B2 | 9/2020 | Denton et al. |
| 10,805,248 | B2 | 10/2020 | Luo et al. |
| 10,872,451 | B2 | 12/2020 | Sheth et al. |
| 10,880,246 | B2 | 12/2020 | Baldwin et al. |
| 10,895,964 | B1 | 1/2021 | Grantham et al. |
| 10,896,534 | B1 | 1/2021 | Smith et al. |
| 10,933,311 | B2 | 3/2021 | Brody et al. |
| 10,938,758 | B2 | 3/2021 | Allen et al. |
| 10,964,082 | B2 | 3/2021 | Amitay et al. |
| 10,979,752 | B1 | 4/2021 | Brody et al. |
| 10,984,575 | B2 | 4/2021 | Assouline et al. |
| 10,992,619 | B2 | 4/2021 | Antmen et al. |
| 11,010,022 | B2 | 5/2021 | Alvi et al. |
| 11,030,789 | B2 | 6/2021 | Chand et al. |
| 11,036,781 | B1 | 6/2021 | Baril et al. |
| 11,063,891 | B2 | 7/2021 | Voss |
| 11,069,103 | B1 | 7/2021 | Blackstock et al. |
| 11,080,917 | B2 | 8/2021 | Monroy-hernández et al. |
| 11,128,586 | B2 | 9/2021 | Al Majid et al. |
| 11,188,190 | B2 | 11/2021 | Blackstock et al. |
| 11,189,070 | B2 | 11/2021 | Jahangiri et al. |
| 11,199,957 | B1 | 12/2021 | Alvi et al. |
| 11,218,433 | B2 | 1/2022 | Baldwin et al. |

(56) References Cited

U.S. PATENT DOCUMENTS 11,229,849 B2 1/2022 Blackstock et al.
11,245,658 B2 2/2022 Grantham et al.
11,249,614 B2 2/2022 Brody
11,263,254 B2 3/2022 Baril et al.
11,270,491 B2 3/2022 Monroy-Hernández et al.
11,284,144 B2 3/2022 Kotsopoulos et al.
2002/0067362 A1 6/2002 Agostino Nocera et al.
2002/0169644 A1 11/2002 Greene
2005/0162419 A1 7/2005 Kim et al.
2005/0206610 A1 9/2005 Cordelli
2006/0294465 A1 12/2006 Ronen et al.
2007/0113181 A1 5/2007 Blattner et al.
2007/0168863 A1 7/2007 Blattner et al.
2007/0176921 A1 8/2007 Iwasaki et al.
2008/0158222 A1 7/2008 Li et al.
2009/0016617 A1 1/2009 Bregman-Amitai et al.
2009/0055484 A1 2/2009 Vuong et al.
2009/0070688 A1 3/2009 Gyorfi et al.
2009/0099925 A1 4/2009 Mehta et al.
2009/0106672 A1 4/2009 Burstrom
2009/0158170 A1 6/2009 Narayanan et al.
2009/0177976 A1 7/2009 Bokor et al.
2009/0202114 A1 8/2009 Morin et al.
2009/0265604 A1 10/2009 Howard et al.
2009/0300525 A1 12/2009 Jolliff et al.
2009/0303984 A1 12/2009 Clark et al.
2010/0011422 A1 1/2010 Mason et al.
2010/0023885 A1 1/2010 Reville et al.
2010/0115426 A1 5/2010 Liu et al.
2010/0162149 A1 6/2010 Sheleheda et al.
2010/0203968 A1 8/2010 Gill et al.
2010/0227682 A1 9/2010 Reville et al.
2011/0093780 A1 4/2011 Dunn
2011/0115798 A1 5/2011 Nayar et al.
2011/0148864 A1 6/2011 Lee et al.
2011/0239136 A1 9/2011 Goldman et al.
2012/0113106 A1 5/2012 Choi et al.
2012/0124458 A1 5/2012 Cruzada
2012/0130717 A1 5/2012 Xu et al.
2013/0103760 A1 4/2013 Golding et al.
2013/0201187 A1 8/2013 Tong et al.
2013/0249948 A1 9/2013 Reitan
2013/0257877 A1 10/2013 Davis
2014/0043329 A1 2/2014 Wang et al.
2014/0055554 A1 2/2014 Du et al.
2014/0125678 A1 5/2014 Wang et al.
2014/0129343 A1 5/2014 Finster et al.
2015/0206349 A1 7/2015 Rosenthal et al.
2016/0134840 A1 5/2016 Mcculloch
2016/0234149 A1 8/2016 Tsuda et al.
2017/0080346 A1 3/2017 Abbas
2017/0087473 A1 3/2017 Siegel et al.
2017/0113140 A1 4/2017 Blackstock et al.
2017/0118145 A1 4/2017 Aittoniemi et al.
2017/0199855 A1 7/2017 Fishbeck
2017/0235848 A1 8/2017 Van Deusen et al.
2017/0310934 A1 10/2017 Du et al.
2017/0312634 A1 11/2017 Ledoux et al.
2018/0047200 A1 2/2018 O'hara et al.
2018/0113587 A1 4/2018 Allen et al.
2018/0115503 A1 4/2018 Baldwin et al.
2018/0198743 A1 7/2018 Blackstock et al.
2018/0315076 A1 11/2018 Andreou
2018/0315133 A1 11/2018 Brody et al.
2018/0315134 A1 11/2018 Amitay et al.
2019/0001223 A1 1/2019 Blackstock et al.
2019/0057616 A1 2/2019 Cohen et al.
2019/0097958 A1 3/2019 Collet et al.
2019/0188920 A1 6/2019 Mcphee et al.
2019/0280997 A1 9/2019 Baldwin et al.
2020/0306637 A1 10/2020 Baldwin et al.
2020/0372127 A1 11/2020 Denton et al.
2020/0410575 A1 12/2020 Grantham et al.
2021/0074047 A1 3/2021 Sheth et al.
2021/0089179 A1 3/2021 Grantham et al.
2021/0104087 A1 4/2021 Smith et al.
2021/0168108 A1 6/2021 Antmen et al.
2021/0170270 A1 6/2021 Brody et al.
2021/0192823 A1 6/2021 Amitay et al.
2021/0209825 A1 7/2021 Assouline et al.
2021/0225058 A1 7/2021 Chand et al.
2021/0240315 A1 8/2021 Alvi et al.
2021/0243482 A1 8/2021 Baril et al.
2021/0243503 A1 8/2021 Kotsopoulos et al.
2021/0256776 A1* 8/2021 Cappello ................ G06T 19/20
2021/0266277 A1 8/2021 Allen et al.
2021/0281897 A1 9/2021 Brody et al.
2021/0285774 A1 9/2021 Collins et al.
2021/0306290 A1 9/2021 Voss
2021/0306451 A1 9/2021 Heikkinen et al.
2021/0385180 A1 12/2021 Al Majid et al.
2021/0405831 A1 12/2021 Mourkogiannis et al.
2021/0409535 A1 12/2021 Mourkogiannis et al.
2022/0012929 A1 1/2022 Blackstock et al.
2023/0077856 A1* 3/2023 Irshad ...................... G06T 7/70
702/94
2024/0046566 A1* 2/2024 Yang ................... G06N 3/0464

FOREIGN PATENT DOCUMENTS

CN 113012282 A * 6/2021 ............ G06F 18/25
EP 2184092 A2 5/2010
JP 2001230801 A 8/2001
JP 5497931 B2 3/2014
KR 101445263 B1 9/2014
WO WO-2003094072 A1 11/2003
WO WO-2004095308 A1 11/2004
WO WO-2006107182 A1 10/2006
WO WO-2007134402 A1 11/2007
WO WO-2012139276 A1 10/2012
WO WO-2013027893 A1 2/2013
WO WO-2013152454 A1 10/2013
WO WO-2013166588 A1 11/2013
WO WO-2014031899 A1 2/2014
WO WO-2014194439 A1 12/2014
WO WO-2016090605 A1 6/2016
WO WO-2018081013 A1 5/2018
WO WO-2018102562 A1 6/2018
WO WO-2018129531 A1 7/2018
WO WO-2019089613 A1 5/2019

OTHER PUBLICATIONS

Feng et al., "TerrainMesh: Metric-Semantic Terrain Reconstruction from Aerial Images Using Joint 2D-3D Learning," arXiv: 2204.10993, 2022. (Year: 2022).*

Kocabas et al., "PARE: Part Attention Regressor for 3D Human Body Estimation", Proceedings of the IEEE/CVF International Conference on Computer Vision, pp. 11127-11137, 2021. (Year: 2021).*

"Bitmoji", Snapchat Support, [Online] Retrieved from the Internet: <URL: https://web.archive.org/web/20190503063620/https://support.snapchat.com/en-US/a/bitmoji>, (captured May 3, 2019), 2 pgs.

"Bitmoji Chrome Extension", [Online] Retrieved from the Internet: <URL: https://web.archive.org/web/20200919024925/https://support.bimoji.com/hc/en-us/articles/360001494066>, (Sep. 19, 2020), 5 pgs.

"Bitmoji Customize text", [Online] Retrieved from the Internet: <URL: https://web.archive.org/web/20210225200456/https://support.bitmoji.com/hc/en-us/articles/360034632291-Customize-Text-on-Bitmoji-Stickers>, (captured Feb. 25, 2021), 3 pgs.

"Bitmoji Family", Snapchat Support, [Online] Retrieved from the Internet: <URL: https://web.archive.org/web/20190503063620/https://support.snapchat.com/en-US/article/bitmoji-family>, (captured May 3, 2019), 4 pgs.

"Instant Comics Starring You & Your Friends", Bitstrips Inc, [Online] Retrieved from the Internet: <URL: https://web.archive.org/web/20150206000940/http://company.bitstrips.com/bitstrips-app.html>, (captured Feb. 6, 2015), 3 pgs.

"Manage Your Bitmoji", Snapchat Support, [Online] Retrieved

(56) References Cited

OTHER PUBLICATIONS from the Internet: <URL: https://web.archive.org/web/20190503063620/https://support.snapchat.com/en-US/a/manage-bitmoji>, (captured May 3, 2019), 3 pgs.
"Your Own Personal Emoji", Bitstrips Inc, [Online] Retrieved from the Internet: <URL: https://web.archive.org/web/20150205232004/http://bitmoji.com/>, (captured Feb. 5, 2015), 3 pgs.
Carnahan, Daniel, "Snap is Offering Personalized Video Content Through Bitmoji TV", Business Insider, [Online] Retrieved from the Internet: <URL: https://www.businessinsider.com/snap-offers-personalized-video-content-through-bitmoji-tv-2019-12>, (2019), 10 pgs.
Constine, Josh, "Snapchat launches Bitmoji merch and comic strips starring your avatar", TechCrunch, [Online] Retrieved from the Internet: <URL: https://techcrunch.com/2018/11/13/bitmoji-store/>, (Nov. 13, 2018), 16 pgs.
Constine, Josh, "Snapchat Launches Bitmoji TV: Zany 4-min Cartoons of Your Avatar", TechCrunch, [Online] Retrieved from the Internet: <URL: https://techcrunch.com/2020/01/30/bitmoji-tv/>, (Jan. 30, 2020), 13 pgs.
Macmillan, Douglas, "Snapchat Buys Bitmoji App for More Than $100 Million", The Wallstreet Journal, [Online] Retrieved from the Internet: <URL: https://www.wsj.com/articles/snapchat-buys-bitmoji-app-for-more-than-100-million-1458876017>, (Mar. 25, 2016), 5 pgs.
Newton, Casey, "Your Snapchat friendships now have their own profiles—and merchandise", The Verge, [Online] Retrieved from the Internet: <URL: https://www.theverge.com/2018/11/13/18088772/snapchat-friendship-profiles-bitmoji-merchandise-comics>, (Nov. 13, 2018), 5 pgs.
Ong, Thuy, "Snapchat takes Bitmoji deluxe with hundreds of new customization options", The Verge, [Online] Retrieved from the Internet on Nov. 2, 2018: <URL: https://www.theverge.com/2018/1/30/16949402/bitmoji-deluxe-snapchat-customization>, (Jan. 30, 2018), 2 pgs.
Reign, Ashley, "How To Add My Friend's Bitmoji To My Snapchat", Women.com, [Online] Retrieved from the Internet: <URL: https://www.women.com/ashleyreign/lists/how-to-add-my-friends-bitmoji-to-my-snapchat>, (Jun. 30, 2017), 7 pgs.
Tumbokon, Karen, "Snapchat Update: How To Add Bitmoji To Customizable Geofilters", International Business Times, [Online] Retrieved from the Internet : <URL: https://www.ibtimes.com/snapchat-update-how-add-bitmoji-customizable-geofilters-2448152>, (Nov. 18, 2016), 6 pgs.
"International Application Serial No. PCT/US2024/018883, International Search Report mailed Jun. 20, 2024", 2 pgs.
"International Application Serial No. PCT/US2024/018883, Written Opinion mailed Jun. 20, 2024 (24", 9 pgs.
Guler, Riza Alp, et al., "DensePose: Dense Human Pose Estimation in the Wild", IEEE/CVF Conference on Computer Vision and Pattern Recognition, IEEE, (Jun. 18, 2018), 10 pgs.
Moon, Gyeongsik, et al., "12L-MeshNet: Image-to-Lixel Prediction Network for Accurate 3D Human Pose and Mesh Estimation from a Single RGB Image", (Nov. 9, 2020), 17 pgs.
"Core ML", Apple Developer Documentation, [Online]. Retrieved from the Internet: <URL: https://web.archive.org/web/20220615172550/https://developer.apple.com/documentation/coreml>, (archived Jun. 15, 2022), 3 pgs.
"TensorFlow Lite", [Online]. Retrieved from the Internet: <URL: https://web.archive.org/web/20221121085048/https://www.tensorflow.org/lite/guide>, (archived Nov. 21, 2022), 5 pgs.
Albahar, Badour, et al., "Pose with Style: Detail-Preserving Pose-Guided Image Synthesis with Conditional StyleGAN", arxiv.org, Cornell University Library, 201 Olin Library Cornell University Ithaca, NY 14853, (Sep. 13, 2021), 11 pgs.
Cho, Junhyeong, et al., "Cross-Attention of Disentangled Modalities for 3D Human Mesh Recovery with Transformers", arXiv preprint arXiv:2207.13820v1, (Jul. 27, 2022), 22 pgs.
Choi, Hongsuk, et al., "Beyond Static Features for Temporally Consistent 3D Human Pose and Shape from a Video", Proceedings of the IEEE/CVF Conference on Computer Vision and Pattern Recognition, (2021), 10 pgs.
Choi, Hongsuk, et al., "Pose2Mesh: Graph Convolutional Network for 3D Human Pose and Mesh Recovery from a 2D Human Pose", ECCV, (2020), 20 pgs.
Corona, Enric, et al., "Learned Vertex Descent: A New Direction for 3D Human Model Fitting", arXiv preprint arXiv:2205.06254v2, (Jul. 19, 2022), 27 pgs.
Du, Chengdu, et al., "Greatness in Simplicity: Unified Self-Cycle Consistency for Parser-Free Virtual Try-On", Advances in Neural Information Processing Systems, 36, (2023), 12 pgs.
Goel, Shubham, et al., "Humans in 4D: Reconstructing and Tracking Humans with Transformers", Proceedings of the IEEE/CVF International Conference on Computer Vision, (2023), 14783-14794.
Guler, Riza Alp, et al., "DensePose: Dense Human Pose Estimation In The Wild", IEEE/CVF Conference on Computer Vision and Pattern Recognition, [Online] Retrieved from the internet: <URL: https://arxiv.org/pdf/1802.00434>, (Feb. 2, 2018), 12 pgs.
Guler, Riza Alp, et al., "HoloPose: Holistic 3D Human Reconstruction In-The-Wild", CVPR, (Jun. 20, 2019), 11 pgs.
Hassan, Mohamed, et al., "Resolving 3D Human Pose Ambiguities with 3D Scene Constraints", Proceedings of the IEEE/CVF International Conference on Computer Vision, (2019), 2282-2292.
He, Kaiming, et al., "Deep Residual Learning for Image Recognition", IEEE Conference on Computer Vision and Pattern Recognition, (2016), 770-778.
Ionescu, Catalin, et al., "Human3.6M: Large Scale Datasets and Predictive Methods for 3D Human Sensing in Natural Environments", IEEE Transactions on Pattern Analysis and Machine Intelligence, vol. 36, No. 7, pp. 1325-1339, Jul. 2014, doi: 10.1109/TPAMI.2013.248, (Jul. 2014), 1325-1339.
Iqbal, Umar, et al., "KAMA: 3D Keypoint Aware Body Mesh Articulation", arXiv preprint arXiv:2104.13502v1, (Apr. 27, 2021), 11 pgs.
Jiang, Wen, et al., "Coherent Reconstruction of Multiple Humans from a Single Image", Proceedings of the IEEE/CVF Conference on Computer Vision and Pattern Recognition, (2020), 82-91.
Joo, Hanbyul, et al., "Exemplar Fine-Tuning for 3D Human Pose Fitting Towards In-the-Wild 3D Human Pose Estimation", arXiv preprint arXiv:2004.03686v1, (Apr. 7, 2020), 10 pgs.
Kanazawa, Angjoo, et al., "End-to-End Recovery of Human Shape and Pose", 2018 IEEE/CVF Conference on Computer Vision and Pattern Recognition (CVPR) IEEE Computer Society, (Jun. 18, 2018), 10 pgs.
Kervadec, Hoel, et al., "Boundary loss for highly unbalanced segmentation", Proceedings of Machine Learning Research 102, (2019), 285-296.
Khirodkar, Rawal, et al., "Occluded Human Mesh Recovery", Proceedings of the IEEE/CVF Conference on Computer Vision and Pattern Recognition (CVPR), (Jun. 2022), 1715-1725.
Kim, Jeonghwan, et al., "Sampling is Matter: Point-guided 3D Human Mesh Reconstruction", Proceedings of the IEEE/CVF Conference on Computer Vision and Pattern Recognition, (12880-12889), 2023.
Kocabas, Muhammed, et al., "PARE: Part Attention Regressor for 3D Human Body Estimation", Proceedings of the IEEE/CVF International Conference on Computer Vision, (2021), 11127-11137.
Kocabas, Muhammed, et al., "SPEC: Seeing People in the Wild with an Estimated Camera", Proceedings of the IEEE/CVF International Conference on Computer Vision, (2021), 11035-11045.
Kocabas, Muhammed, et al., "VIBE: Video Inference for Human Body Pose and Shape Estimation", Proceedings of the IEEE/CVF Conference on Computer Vision and Pattern Recognition, (2020), 5253-5263.
Kolotouros, Nikos, et al., "Convolutional Mesh Regression for Single-Image Human Shape Reconstruction", Proceedings of the IEEE/CVF Conference on Computer Vision and Pattern Recognition, (2019), 4501-4510.

(56) References Cited

OTHER PUBLICATIONS

Kolotouros, Nikos, "Learning to Reconstruct 3D Human Pose and Shape via Model-fitting in the Loop", Proceedings of the IEEE/CVF International Conference on Computer Vision, (2019), 2252-2261.
Kolotouros, Nikos, et al., "Probabilistic Modeling for Human Mesh Recovery", Proceedings of the IEEE/CVF International Conference on Computer Vision, (2021), 11605-11614.
Li, Jiefeng, et al., "HybrIK: A Hybrid Analytical-Neural Inverse Kinematics Solution for 3D Human Pose and Shape Estimation", Proceedings of the IEEE/CVF Conference on Computer Vision and Pattern Recognition, (2021), 3383-3393.
Li, Jiefeng, et al., "NIKI: Neural Inverse Kinematics with Invertible Neural Networks for 3D Human Pose and Shape Estimation", Proceedings of the IEEE/CVF Conference on Computer Vision and Pattern Recognition, (2023), 12933-12942.
Li, Zhihao, et al., "CLIFF: Carrying Location Information in Full Frames into Human Pose and Shape Estimation", European Conference on Computer Vision (ECCV), (2022), 17 pgs.
Lin, Kevin, et al., "End-to-End Human Pose and Mesh Reconstruction with Transformers", Proceedings of the IEEE/CVF Conference on Computer Vision and Pattern Recognition, (2021), 1954-1963.
Lin, Kevin, et al., "Mesh Graphormer", Proceedings of the IEEE/CVF International Conference on Computer Vision, (2021), 12939-12948.
Lin, Tsung-Yi, et al., "Microsoft COCO: Common Objects in Context", Computer Vision—ECCV 2014:13th European Conference, Zurich, Switzerland, Sep. 6-12, 2014, Proceedings, Part V 13, pp. 740-755, Springer, (2014), 15 pgs.
Ma, Xiaoxuan, et al., "3D Human Mesh Estimation from Virtual Markers", Proceedings of the IEEE/CVF Conference on Computer Vision and Pattern Recognition, (2023), 534-543.
Mehta, Dushyant, et al., "Monocular 3D Human Pose Estimation In The Wild Using Improved CNN Supervision", arXiv preprint arXiv:1611.09813v5, (Oct. 4, 2017), 16 pgs.
Moon, Gyeongsik, et al., "I2L-MeshNet: Image-to-Lixel Prediction Network for Accurate 3D Human Pose and Mesh Estimation from a Single RGB Image", arXiv:2008.03713v2 [cs.CV], (Nov. 1, 2020), 23 pgs.
Moon, Gyeongsik, et al., "NeuralAnnot: Neural Annotator for 3D Human Mesh Training Sets", Proceedings of the IEEE/CVF Conference on Computer Vision and Pattern Recognition, (2022), 2299-2307.
Muller, Lea, et al., "On Self-Contact and Human Pose", Proceedings of the IEEE/CVF Conference on Computer Vision and Pattern Recognition, (2021), 10 pgs.
Pavlakos, Georgios, et al., "Expressive Body Capture: 3D Hands, Face, and Body From a Single Image", IEEE/CVF Conference on Computer Vision and Pattern Recognition (CVPR), (2019), 22 pgs.
Pavlakos, Georgios, et al., "Learning to Estimate 3D Human Pose and Shape from a Single Color Image", Proceedings of the IEEE Conference on Computer Vision and Pattern Recognition, (2018), 459-468.
Sandler, Mark, et al., "MobileNetV2: Inverted Residuals and Linear Bottlenecks", arXiv preprint arXiv:1801.04381v4 [cs.CV], (Mar. 21, 2019), 14 pgs.
Sarkar, Kripasindhu, "Style and Pose Control for Image Synthesis of Humans from a Single Monocular View", [Online] Retrieved from the internet: <https://arxiv.Org/pdf/2102.11263>, (Feb. 22, 2021), 15 pgs.
Shetty, Karthik, et al., "Pliks: A pseudo-linear inverse kinematic solver for 3d human body estimation", Proceedings of the IEEE/CVF Conference on Computer Vision and Pattern Recognition, (2023), 574-584.
Song, Jie, et al., "Human Body Model Fitting by Learned Gradient Descent", ECCV, (2020), 17 pgs.
Sun, Yu, et al., "Monocular, One-stage, Regression of Multiple 3D People", Proceedings of the IEEE/CVF International Conference on Computer Vision, (2021), 11179-11188.
Sun, Yu, et al., "Putting people in their place: Monocular regression of 3d people in depth", Proceedings of the IEEE/CVF Conference on Computer Vision and Pattern Recognition, (2022), 13243-13252.
Von Marcard, Timo, et al., "Recovering Accurate 3D Human Pose in The Wild Using IMUs and a Moving Camera", Proceedings of the European Conference on Computer Vision (ECCV), (2018), 17 pgs.
Wang, Jingdong, et al., "Deep High-Resolution Representation Learning for Visual Recognition", IEEE Transactions on Pattern Analysis and Machine Intelligence, (Mar. 2020), 23 pgs.
Wang, Wenjia, et al., "Zolly: Zoom Focal Length Correctly for Perspective-Distorted Human Mesh Reconstruction", Proceedings of the IEEE/CVF International Conference on Computer Vision, (2023), 3925-3935.
Wang, Yufu, et al., "ReFit: Recurrent Fitting Network for 3D Human Recovery", Proceedings of the IEEE/CVF International Conference on Computer Vision, (2023), 14644-14654.
Xiao, Bin, et al., "Simple Baselines for Human Pose Estimation and Tracking", Proceedings of the European Conference on Computer Vision (ECCV), (2018), 16 pgs.
Xu, Hongyi, et al., "GHUM & GHUML: Generative 3D Human Shape and Articulated Pose Models", Proceedings of the IEEE/CVF Conference on Computer Vision and Pattern Recognition, (2020), 6184-6193.
Yao, Chun-Han, et al., "Learning Visibility for Robust Dense Human Body Estimation", European Conference on Computer Vision (ECCV), (2022), 17 pgs.
Zanfir, Andrei, et al., "Weakly Supervised 3D Human Pose and Shape Reconstruction with Normalizing Flows", European Conference on Computer Vision (ECCV), Springer, (2020), 17 pgs.
Zhang, Hongwen, et al., "Learning 3D Human Shape and Pose From Dense Body Parts", IEEE Transactions on Pattern Analysis and Machine Intelligence, vol. 44, Issue 5, (May 1, 2022), 2610-2627.
Zhang, Hongwen, et al., "PyMAF: 3D Human Pose and Shape Regression with Pyramidal Mesh Alignment Feedback Loop", Proceedings of the IEEE/CVF International Conference on Computer Vision, (2021), 11446-11456.
Zhang, Tianshu, et al., "Object-Occluded Human Shape and Pose Estimation from a Single Color Image", Proceedings of the IEEE/CVF Conference on Computer Vision and Pattern Recognition, (2020), 7376-7385.

* cited by examiner

UNIFYING DENSEPOSE AND 3D BODY MESH RECONSTRUCTION

CLAIM OF PRIORITY

This application claims the benefit of priority to Greece Patent Application Serial No. 20/230100198, filed on Mar. 8, 2023, which is incorporated herein by reference in its entirety.

TECHNICAL FIELD

The present disclosure relates generally to providing augmented reality (AR) experiences using an interaction application.

BACKGROUND

Augmented reality (AR) is a modification of a virtual environment. For example, in virtual reality (VR), a user is completely immersed in a virtual world, whereas in AR, the user is immersed in a world where virtual objects are combined or superimposed on the real world. An AR system aims to generate and present virtual objects that interact realistically with a real-world environment and with each other. Examples of AR applications can include single or multiple player video games, instant messaging systems, and the like.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some nonlimiting examples are illustrated in the figures of the accompanying drawings in which.

DETAILED DESCRIPTION

Figure 1:
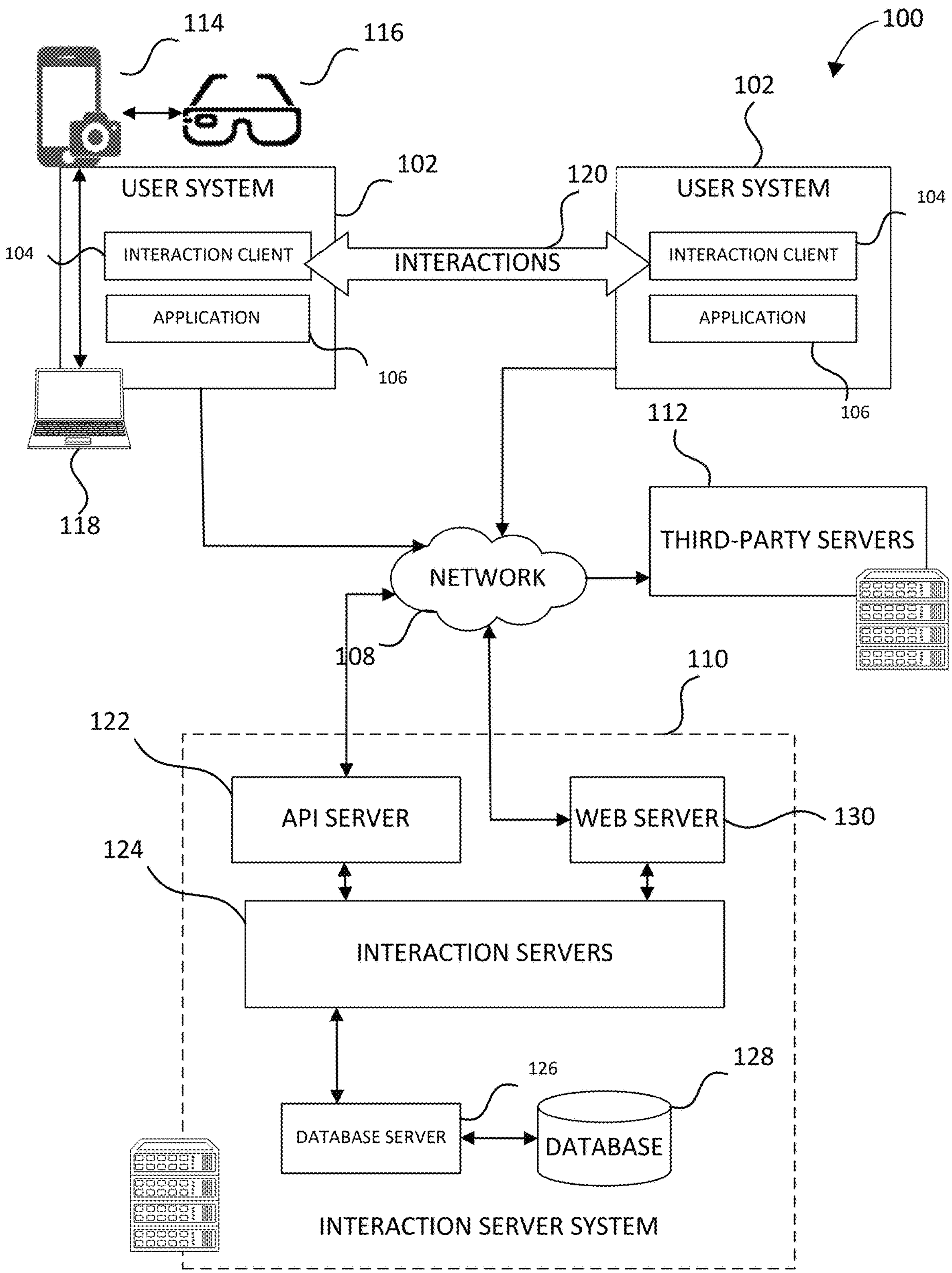
FIG. 1 is a diagrammatic representation of a networked environment in which the present disclosure may be deployed, according to some examples.

The description that follows includes systems, methods, techniques, instruction sequences, and computing machine program products that embody illustrative examples of the disclosure. In the following description, for the purposes of explanation, numerous specific details are set forth in order to provide an understanding of various examples. It will be evident, however, to those skilled in the art, that examples may be practiced without these specific details. In general, well-known instruction instances, protocols, structures, and techniques are not necessarily shown in detail.

Typically, VR and AR systems display images representing a given user by capturing an image of the user and, in addition, obtaining a depth map using a depth sensor of the real-world human body depicted in the image. By processing the depth map and the image together, the VR and AR systems can detect positioning of the user in the image and can appropriately modify the user or background in the images. While such systems work well, the need for a depth sensor limits the scope of their applications. This is because adding depth sensors to user devices for the purpose of modifying images increases the overall cost and complexity of the devices, making them less attractive and more difficult to implement in a mobile device setting.

Certain systems estimate three-dimensional (3D) meshes of persons depicted in images to provide AR/VR experiences. Human 3D pose understanding is essential to human-computer interaction, motion capture, action recognition, and augmented and virtual reality (AR/VR). Human Mesh Reconstruction has received increased attention recently based on the premise that information beyond the 3D skeleton can unlock new experiences that require detailed estimation of 3D human geometry, such as avatar construction and telepresence for VR or visual effects and virtual try-on for AR.

Despite the rapid progress in 3D mesh reconstruction technology, the meshes resulting from current systems are still far from being pixel-accurate when projected back to the image domain. Mesh reconstruction evaluation is 3D-skeleton or 3D-mesh based and does not reflect 2D reprojection accuracy. However, when persons are close to the camera, small 3D errors can result in very visible 2D reprojection inaccuracies. For AR use cases that are predominantly selfie-based, this can "break the illusion": the misalignments are easily perceived by the user, while the depth component of 3D pose accuracy can be considered secondary since this is factored out by the reprojection to 2D.

Typical systems rely on a densepose to generate 3D meshes. Particularly, densepose densely associates pixels with surface coordinates either through UV coordinate regression or by predicting 3D canonical coordinates. UV denote the axes of a 2D texture to distinguish from X, Y, Z axes that denote the 3D object model. By treating this as a continuous regression task, localization of individual mesh vertices is avoided, thereby allowing them to train with annotations collected on randomly chosen points and also work with a moderate number of dense predictions. Despite its efficiency, however, this approach is of little direct use for mesh recovery.

Some other conventional systems predict the 3D mesh through a parametric human model using an already cropped image. A convolutional encoder is used to minimize the 2D joints' re-projection error, while a discriminator decides if the 3D parameters are plausible. Such systems are incredibly complex to implement, such as on mobile device platforms, and still produce results that are not pixel accurate.

The disclosed techniques seek to improve the way in which a 3D mesh is generated for one or more real-world objects (e.g., real-world persons) depicted in an image or video. The disclosed techniques use one or more machine learning models to predict a densepose and localizing mesh vertices. Particularly, the disclosed techniques predict a sparsepose, which represents a tensor of heatmaps for the 2D position of a sparse subset of body vertices. These vertices are set to form a low-polygon approximation of the full-blown, high-resolution mesh, which comes with two benefits. Firstly, the disclosed techniques can smoothly interpolate between the 2D vertices belonging to a triangle using barycentric coordinates. This allows the disclosed techniques to predict a continuous UV field in the interior of a triangle as a weighted combination of the vertex UV values and use the densepose dataset for supervision. Secondly, the disclosed techniques can continuously localize these vertices in 2D using argsoftmax, and then lift them to 3D through a per-vertex monocular depth prediction. This provides a bottom-up estimate of 3D mesh geometry that can be projected back to the image as accurately as the original sparsepose prediction with high pixel-level accuracy.

The disclosed machine learning models are trained based on ground-truth densepose image information and a plurality of losses. For example, the disclosed techniques use a surface-based loss that forces the softmax-based posterior over sparsepose vertices to approximate the barycentric coordinates on any pixel that has UV annotation. This enables the densepose to supervise sparsepose competition across vertex channels on a given pixel. The disclosed techniques introduce a second surface-based loss that forces sparsepose to place vertices so that the image coordinates of annotated UV values align with the positions where they were annotated. This enables the use of densepose to supervise the sparsepose competition for the three vertex channels that relate to any UV-annotated pixel. The disclosed techniques provide an architecture that allows regression per vertex depths based on a 3D pose skeleton regressed by a separate task head. This enables exploiting sparse 3D skeleton supervision and driving the remaining mesh vertices through more easily predictable offsets. An additional task is provided to predict the part of the mesh that is not visible within a frame (occluded/self-occluded/truncated vertices), which allows the disclosed techniques to combine the sparsepose-based vertices with an "inpainted mesh." All of the aforementioned layers feed off from a common backbone and provide an end-to-end trainable architecture that can jointly supervise with multiple sources of data. These losses enable training the disclosed sparsepose system (machine learning models) with a densepose accuracy that is on par with strong baselines for densepose estimation.

According to the disclosed techniques, a system receives an image that includes a depiction of a real-world object in a real-world environment. The disclosed system applies a first machine learning model to a portion of the image that depicts the real-world object to predict a tensor of heatmaps representing vertex positions of a plurality of triangles of a 3D mesh corresponding to the real-world object. First and second heatmaps of the tensor represent respectively first and second groups of possible coordinates for a first vertex of a first triangle of the plurality of triangles. The disclosed system generates the 3D mesh based on the selected subset of the tensor of heatmaps.

This simplifies the process of adding AR graphics to an image or video, which significantly reduces design constraints and costs in generating such AR graphics and decreases the amount of processing complexities and power and memory requirements. This also improves the illusion of the AR graphics being part of a real-world environment depicted in an image or video that depicts real-world objects. This enables seamless and efficient addition of AR graphics to an underlying image or video in real time on small-scale mobile devices. The disclosed techniques can be applied exclusively or mostly on a mobile device without the need for the mobile device to send images/videos to a server. In other examples, the disclosed techniques are applied exclusively or mostly on a remote server or can be divided between a mobile device and a server.

This improves the overall experience of the user in using the electronic device. Also, by providing such AR experiences without using a depth sensor, the overall amount of system resources needed to accomplish a task is reduced. As used herein, "article of clothing," "fashion item," and "garment" are used interchangeably and should be understood to have the same meaning. Article of clothing, garment, or fashion item can include a shirt, skirt, dress, shoes, purse, furniture item, household item, eyewear, eyeglasses, AR logos, AR emblems, pants, shorts, jackets, t-shirts, blouses, glasses, jewelry, earrings, bunny ears, a hat, earmuffs, or any other suitable item or object.

Networked Computing Environment

FIG. 1 is a block diagram showing an example interaction system 100 for facilitating interactions (e.g., exchanging text messages, conducting text audio and video calls, or playing games) over a network. The interaction system 100 includes multiple user systems 102, each of which hosts multiple applications, including an interaction client 104 and other applications 106. Each interaction client 104 is communicatively coupled, via one or more communication networks including a network 108 (e.g., the Internet), to other instances of the interaction client 104 (e.g., hosted on respective other user systems 102), an interaction server system 110 and third-party servers 112). An interaction client 104 can also communicate with locally hosted applications 106 using Applications Program Interfaces (APIs).

Each user system 102 may include multiple user devices, such as a mobile device 114, head-wearable apparatus 116, and a computer client device 118 that are communicatively connected to exchange data and messages.

An interaction client 104 interacts with other interaction clients 104 and with the interaction server system 110 via the network 108. The data exchanged between the interaction clients 104 (e.g., interactions 120) and between the interaction clients 104 and the interaction server system 110 includes functions (e.g., commands to invoke functions) and payload data (e.g., text, audio, video, or other multimedia data).

The interaction server system 110 provides server-side functionality via the network 108 to the interaction clients 104. While certain functions of the interaction system 100 are described herein as being performed by either an interaction client 104 or by the interaction server system 110, the location of certain functionality either within the interaction client 104 or the interaction server system 110 may be a design choice. For example, it may be technically preferable to initially deploy particular technology and functionality within the interaction server system 110 but to later migrate this technology and functionality to the interaction client 104 where a user system 102 has sufficient processing capacity.

The interaction server system 110 supports various services and operations that are provided to the interaction clients 104. Such operations include transmitting data to, receiving data from, and processing data generated by the interaction clients 104. This data may include message content, client device information, geolocation information, media augmentation and overlays, message content persistence conditions, entity relationship information, and live event information. Data exchanges within the interaction system 100 are invoked and controlled through functions available via user interfaces (UIs) of the interaction clients 104.

Turning now specifically to the interaction server system 110, an Application Program Interface (API) server 122 is coupled to and provides programmatic interfaces to interaction servers 124, making the functions of the interaction servers 124 accessible to interaction clients 104, other applications 106 and third-party server 112. The interaction servers 124 are communicatively coupled to a database server 126, facilitating access to a database 128 that stores data associated with interactions processed by the interaction servers 124. Similarly, a web server 130 is coupled to the interaction servers 124 and provides web-based interfaces to the interaction servers 124. To this end, the web server 130 processes incoming network requests over the Hypertext Transfer Protocol (HTTP) and several other related protocols.

The API server 122 receives and transmits interaction data (e.g., commands and message payloads) between the interaction servers 124 and the client systems 102 (and, for example, interaction clients 104 and other application 106) and the third-party server 112. Specifically, the API server 122 provides a set of interfaces (e.g., routines and protocols) that can be called or queried by the interaction client 104 and other applications 106 to invoke functionality of the interaction servers 124. The API server 122 exposes various functions supported by the interaction servers 124, including account registration; login functionality; the sending of interaction data, via the interaction servers 124, from a particular interaction client 104 to another interaction client 104; the communication of media files (e.g., images or video) from an interaction client 104 to the interaction servers 124; the settings of a collection of media data (e.g., a story); the retrieval of a list of friends of a user of a user system 102; the retrieval of messages and content; the addition and deletion of entities (e.g., friends) to an entity relationship graph; the location of friends within an entity relationship graph; and opening an application event (e.g., relating to the interaction client 104).

The interaction servers 124 host multiple systems and subsystems, described below with reference to FIG. 2.

Linked Applications

Returning to the interaction client 104, features and functions of an external resource (e.g., a linked application 106 or applet) are made available to a user via an interface of the interaction client 104. In this context, "external" refers to the fact that the application 106 or applet is external to the interaction client 104. The external resource is often provided by a third party but may also be provided by the creator or provider of the interaction client 104. The interaction client 104 receives a user selection of an option to launch or access features of such an external resource. The external resource may be the application 106 installed on the user system 102 (e.g., a "native app"), or a small-scale version of the application (e.g., an "applet") that is hosted on the user system 102 or remote of the user system 102 (e.g., on third-party servers 112). The small-scale version of the application includes a subset of features and functions of the application (e.g., the full-scale, native version of the application) and is implemented using a markup-language document. In some examples, the small-scale version of the application (e.g., an "applet") is a web-based, markup-language version of the application and is embedded in the interaction client 104. In addition to using markup-language documents (e.g., a .*ml file), an applet may incorporate a scripting language (e.g., a .*js file or a .json file) and a style sheet (e.g., a .*ss file).

In response to receiving a user selection of the option to launch or access features of the external resource, the interaction client 104 determines whether the selected external resource is a web-based external resource or a locally-installed application 106. In some cases, applications 106 that are locally installed on the user system 102 can be launched independently of and separately from the interaction client 104, such as by selecting an icon corresponding to the application 106 on a home screen of the user system 102. Small-scale versions of such applications can be launched or accessed via the interaction client 104 and, in some examples, no or limited portions of the small-scale application can be accessed outside of the interaction client 104. The small-scale application can be launched by the interaction client 104 receiving, from a third-party server 112 for example, a markup-language document associated with the small-scale application and processing such a document.

In response to determining that the external resource is a locally-installed application 106, the interaction client 104 instructs the user system 102 to launch the external resource by executing locally-stored code corresponding to the external resource. In response to determining that the external resource is a web-based resource, the interaction client 104 communicates with the third-party servers 112 (for example) to obtain a markup-language document corresponding to the selected external resource. The interaction client 104 then processes the obtained markup-language document to present the web-based external resource within a user interface of the interaction client 104.

The interaction client 104 can notify a user of the user system 102, or other users related to such a user (e.g., "friends"), of activity taking place in one or more external resources. For example, the interaction client 104 can provide participants in a conversation (e.g., a chat session) in the interaction client 104 with notifications relating to the current or recent use of an external resource by one or more members of a group of users. One or more users can be invited to join in an active external resource or to launch a recently-used but currently inactive (in the group of friends) external resource. The external resource can provide participants in a conversation, each using respective interaction clients 104, with the ability to share an item, status, state, or location in an external resource in a chat session with one or more members of a group of users. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the interaction client 104. The external resource can selectively include different media items in the responses, based on a current context of the external resource.

The interaction client 104 can present a list of the available external resources (e.g., applications 106 or applets) to a user to launch or access a given external resource. This list can be presented in a context-sensitive menu. For example, the icons representing different ones of the application 106 (or applets) can vary based on how the menu is launched by the user (e.g., from a conversation interface or from a non-conversation interface).

In some examples, the interaction client 104 can utilize the sparsepose estimation system 500 to generate an AR experience in which one or more AR graphic elements are overlaid in a pixel accurate manner over a person depicted in an image or video. The interaction client 104 can render an image or video that depicts the real-world person wearing a fashion item based on a 3D mesh predicted/generated by the sparsepose estimation system 500. In this way, a user can view how the user looks wearing one or more virtual fashion items. Article of clothing, garment, or fashion item can include a shirt, skirt, dress, shoes, purse, furniture item, household item, eyewear, eyeglasses, AR logos, AR emblems, pants, shorts, jackets, t-shirts, blouses, glasses, jewelry, earrings, bunny ears, a hat, earmuffs, or any other suitable item or object. Further details of this AR experience are discussed below in connection with the sparsepose estimation system 500 of FIG. 5.

System Architecture

Figure 2:
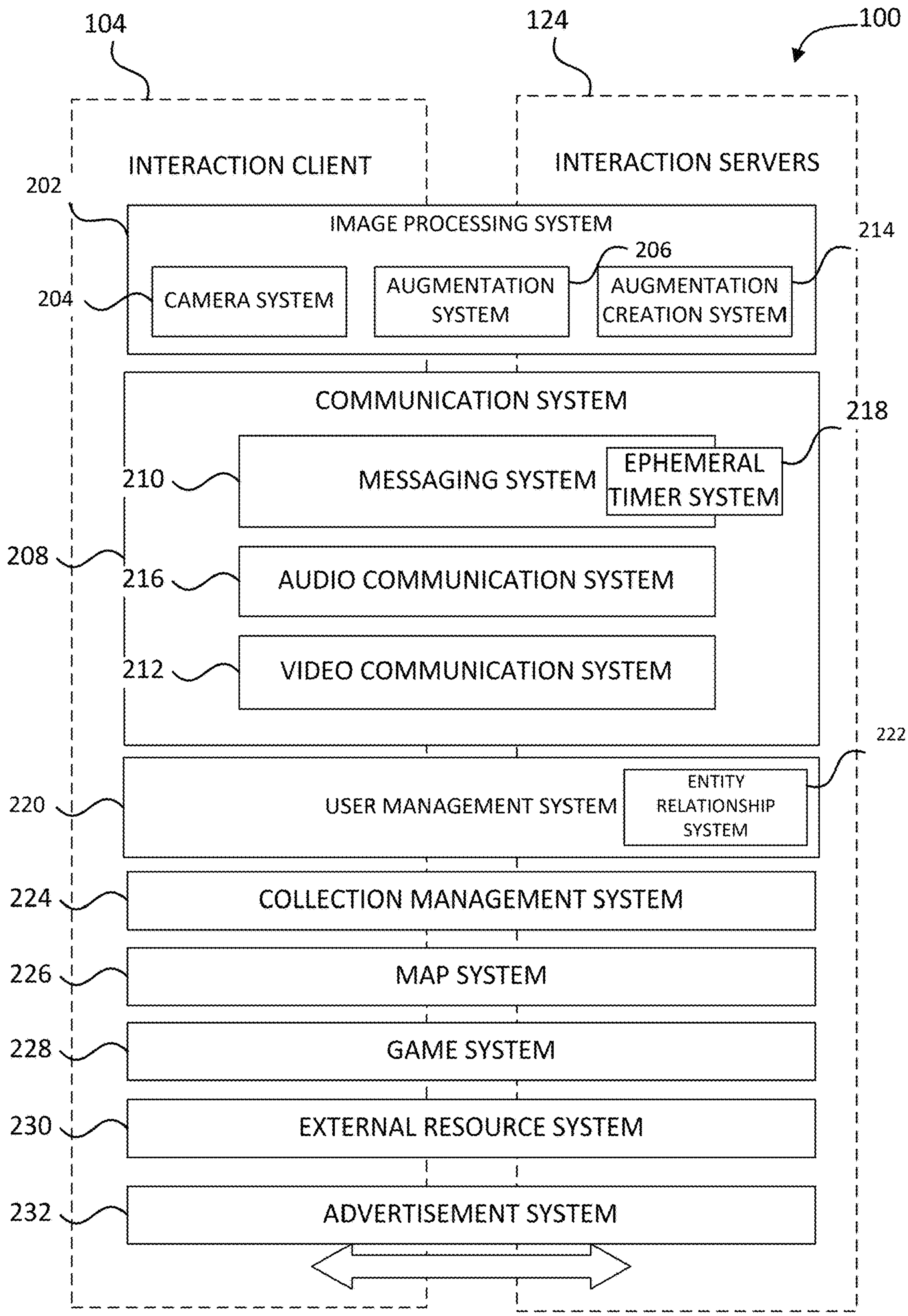
FIG. 2 is a diagrammatic representation of a messaging system, according to some examples, that has both client-side and server-side functionality.

FIG. 2 is a block diagram illustrating further details regarding the interaction system 100, according to some examples. Specifically, the interaction system 100 is shown to comprise the interaction client 104 and the interaction servers 124. The interaction system 100 embodies multiple subsystems, which are supported on the client-side by the interaction client 104 and on the server-side by the interaction servers 124. Example subsystems are discussed below and can include a sparsepose estimation system 500 that enables a user to launch an AR experience. An illustrative implementation of the sparsepose estimation system 500 is shown and described in connection with FIG. 5 below.

Specifically, the sparsepose estimation system 500 is a component that can be accessed by an AR/VR application implemented on the user system 102. The AR/VR application uses an RGB camera to capture a monocular image of a real-world object. The AR/VR application applies various trained machine learning techniques or machine learning models on the captured image of the real-world object to generate body landmark features representing the real-world object depicted in the images or videos and to apply one or more AR visual effects to the captured image or video based on body landmark features. In some implementations, the AR/VR application continuously captures images of the user and updates the body landmark features in real time or periodically to continuously or periodically update the applied one or more visual effects. This allows the user to move around in the real world and see the one or more visual effects update in real time.

An image processing system 202 provides various functions that enable a user to capture and augment (e.g., annotate or otherwise modify or edit) media content associated with a message.

A camera system 204 includes control software (e.g., in a camera application) that interacts with and controls hardware camera hardware (e.g., directly or via operating system controls) of the user system 102 to modify and augment real-time images captured and displayed via the interaction client 104.

The augmentation system 206 provides functions related to the generation and publishing of augmentations (e.g., media overlays) for images captured in real-time by cameras of the user system 102 or retrieved from memory of the user system 102. For example, the augmentation system 206 operatively selects, presents, and displays media overlays (e.g., an image filter or an image lens) to the interaction client 104 for the augmentation of real-time images received via the camera system 204 or stored images retrieved from memory 1302 (shown in FIG. 13) of a user system 102. These augmentations are selected by the augmentation system 206 and presented to a user of an interaction client 104, based on a number of inputs and data, such as for example:

- Geolocation of the user system 102; and
- Entity relationship information of the user of the user system 102.

An augmentation may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo or video) at user system 102 for communication in a message, or applied to video content, such as a video content stream or feed transmitted from an interaction client 104. As such, the image processing system 202 may interact with, and support, the various subsystems of the communication system 208, such as the messaging system 210 and the video communication system 212.

A media overlay may include text or image data that can be overlaid on top of a photograph taken by the user system 102 or a video stream produced by the user system 102. In some examples, the media overlay may be a location overlay (e.g., Venice beach), a name of a live event, or a name of a merchant overlay (e.g., Beach Coffee House). In further examples, the image processing system 202 uses the geolocation of the user system 102 to identify a media overlay that includes the name of a merchant at the geolocation of the user system 102. The media overlay may include other indicia associated with the merchant. The media overlays may be stored in the databases 128 and accessed through the database server 126.

The image processing system 202 provides a user-based publication platform that enables users to select a geolocation on a map and upload content associated with the selected geolocation. The user may also specify circumstances under which a particular media overlay should be offered to other users. The image processing system 202 generates a media overlay that includes the uploaded content and associates the uploaded content with the selected geolocation.

The augmentation creation system 214 supports augmented reality developer platforms and includes an application for content creators (e.g., artists and developers) to create and publish augmentations (e.g., augmented reality experiences) of the interaction client 104. The augmentation creation system 214 provides a library of built-in features and tools to content creators including, for example custom shaders, tracking technology, and templates.

In some examples, the augmentation creation system 214 provides a merchant-based publication platform that enables merchants to select a particular augmentation associated with a geolocation via a bidding process. For example, the augmentation creation system 214 associates a media overlay of the highest bidding merchant with a corresponding geolocation for a predefined amount of time.

A communication system 208 is responsible for enabling and processing multiple forms of communication and interaction within the interaction system 100 and includes a messaging system 210, an audio communication system 216, and a video communication system 212. The messaging system 210 is responsible for enforcing the temporary or time-limited access to content by the interaction clients 104. The messaging system 210 incorporates multiple timers (e.g., within an ephemeral timer system 218) that, based on duration and display parameters associated with a message or collection of messages (e.g., a story), selectively enable access (e.g., for presentation and display) to messages and associated content via the interaction client 104. Further details regarding the operation of the ephemeral timer system 218 are provided below. The audio communication system 216 enables and supports audio communications (e.g., real-time audio chat) between multiple interaction clients 104. Similarly, the video communication system 212 enables and supports video communications (e.g., real-time video chat) between multiple interaction clients 104.

A user management system 220 is operationally responsible for the management of user data and profiles, and includes an entity relationship (ER) system 222 that maintains information regarding relationships between users of the interaction system 100.

A collection management system 224 is operationally responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 224 may also be responsible for publishing an icon that provides notification of a particular collection to the user interface of the interaction client 104. The collection management system 224 includes a curation function that allows a collection manager to manage and curate a particular collection of content. For example, the curation interface enables an event organizer to curate a collection of content relating to a specific event (e.g., to delete inappropriate content or redundant messages). Additionally, the collection management system 224 employs machine vision (or image recognition technology) and content rules to curate a content collection automatically. In certain examples, compensation may be paid to a user to include user-generated content into a collection. In such cases, the collection management system 224 operates to automatically make payments to such users to use their content.

A map system 226 provides various geographic location functions and supports the presentation of map-based media content and messages by the interaction client 104. For example, the map system 226 enables the display of user icons or avatars (e.g., stored in profile data 302 of FIG. 3) on a map to indicate a current or past location of "friends" of a user, as well as media content (e.g., collections of messages including photographs and videos) generated by such friends, within the context of a map. For example, a message posted by a user to the interaction system 100 from a specific geographic location may be displayed within the context of a map at that particular location to "friends" of a specific user on a map interface of the interaction client 104. A user can furthermore share his or her location and status information (e.g., using an appropriate status avatar) with other users of the interaction system 100 via the interaction client 104, with this location and status information being similarly displayed within the context of a map interface of the interaction client 104 to selected users.

A game system 228 provides various gaming functions within the context of the interaction client 104. The interaction client 104 provides a game interface providing a list of available games that can be launched by a user within the context of the interaction client 104 and played with other users of the interaction system 100. The interaction system 100 further enables a particular user to invite other users to participate in the play of a specific game by issuing invitations to such other users from the interaction client 104. The interaction client 104 also supports audio, video, and text messaging (e.g., chats) within the context of gameplay, provides a leaderboard for the games, and also supports the provision of in-game rewards (e.g., coins and items).

An external resource system 230 provides an interface for the interaction client 104 to communicate with remote servers (e.g., third-party servers 112) to launch or access external resources, i.e., applications or applets. Each third-party server 112 hosts, for example, a markup language (e.g., HTML5) based application or a small-scale version of an application (e.g., game, utility, payment, or ride-sharing application). The interaction client 104 may launch a web-based resource (e.g., application) by accessing the HTML5 file from the third-party servers 112 associated with the web-based resource. Applications hosted by third-party servers 112 are programmed in JavaScript leveraging a Software Development Kit (SDK) provided by the interaction servers 124. The SDK includes Application Programming Interfaces (APIs) with functions that can be called or invoked by the web-based application. The interaction servers 124 host a JavaScript library that provides a given external resource access to specific user data of the interaction client 104. HTML5 is an example of technology for programming games, but applications and resources programmed based on other technologies can be used.

To integrate the functions of the SDK into the web-based resource, the SDK is downloaded by the third-party server 112 from the interaction servers 124 or is otherwise received by the third-party server 112. Once downloaded or received, the SDK is included as part of the application code of a web-based external resource. The code of the web-based resource can then call or invoke certain functions of the SDK to integrate features of the interaction client 104 into the web-based resource.

The SDK stored on the interaction server system 110 effectively provides the bridge between an external resource (e.g., applications 106 or applets) and the interaction client 104. This gives the user a seamless experience of communicating with other users on the interaction client 104 while also preserving the look and feel of the interaction client 104. To bridge communications between an external resource and an interaction client 104, the SDK facilitates communication between third-party servers 112 and the interaction client 104. A Web ViewJavaScriptBridge running on a user system 102 establishes two one-way communication channels between an external resource and the interaction client 104. Messages are sent between the external resource and the interaction client 104 via these communication channels asynchronously. Each SDK function invocation is sent as a message and callback. Each SDK function is implemented by constructing a unique callback identifier and sending a message with that callback identifier.

By using the SDK, not all information from the interaction client 104 is shared with third-party servers 112. The SDK limits which information is shared based on the needs of the external resource. Each third-party server 112 provides an HTML5 file corresponding to the web-based external resource to interaction servers 124. The interaction servers 124 can add a visual representation (such as a box art or other graphic) of the web-based external resource in the interaction client 104. Once the user selects the visual representation or instructs the interaction client 104 through a GUI of the interaction client 104 to access features of the web-based external resource, the interaction client 104 obtains the HTML5 file and instantiates the resources to access the features of the web-based external resource.

The interaction client 104 presents a graphical user interface (e.g., a landing page or title screen) for an external resource. During, before, or after presenting the landing page or title screen, the interaction client 104 determines whether the launched external resource has been previously authorized to access user data of the interaction client 104. In response to determining that the launched external resource has been previously authorized to access user data of the interaction client 104, the interaction client 104 presents another graphical user interface of the external resource that includes functions and features of the external resource. In response to determining that the launched external resource has not been previously authorized to access user data of the interaction client 104, after a threshold period of time (e.g., 3 seconds) of displaying the landing page or title screen of the external resource, the interaction client 104 slides up (e.g., animates a menu as surfacing from a bottom of the screen to a middle or other portion of the screen) a menu for authorizing the external resource to access the user data. The menu identifies the type of user data that the external resource will be authorized to use. In response to receiving a user selection of an accept option, the interaction client 104 adds the external resource to a list of authorized external resources and allows the external resource to access user data from the interaction client 104. The external resource is authorized by the interaction client 104 to access the user data under an OAuth 2 framework.

The interaction client 104 controls the type of user data that is shared with external resources based on the type of external resource being authorized. For example, external resources that include full-scale applications (e.g., an application 106) are provided with access to a first type of user data (e.g., two-dimensional avatars of users with or without different avatar characteristics). As another example, external resources that include small-scale versions of applications (e.g., web-based versions of applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

An advertisement system 232 operationally enables the purchasing of advertisements by third parties for presentation to end-users via the interaction clients 104 and also handles the delivery and presentation of these advertisements.

Data Architecture

Figure 3:
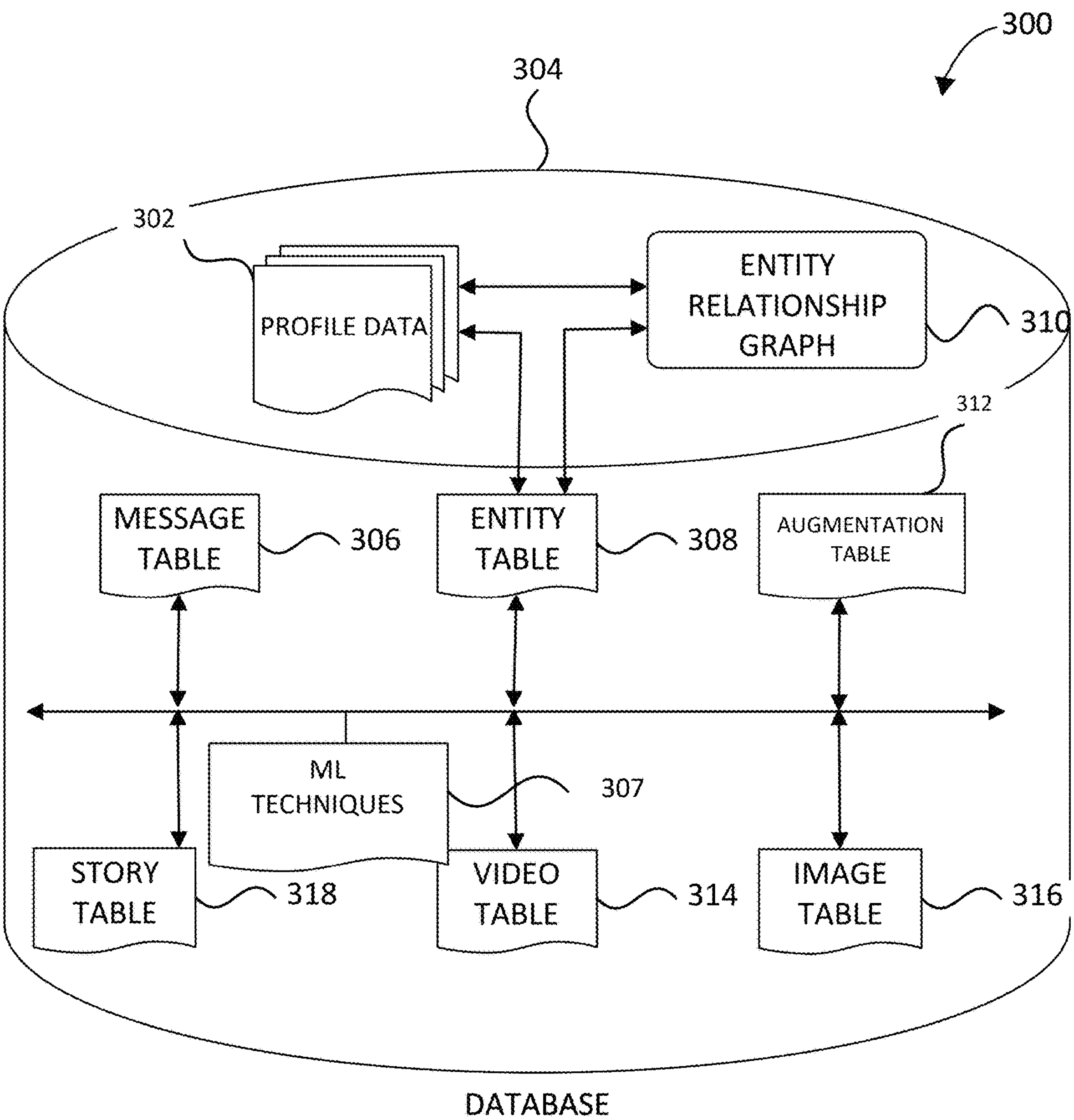
FIG. 3 is a diagrammatic representation of a data structure as maintained in a database, according to some examples.

FIG. 3 is a schematic diagram illustrating data structures 300, which may be stored in the database 304 of the interaction server system 110, according to certain examples. While the content of the database 304 is shown to comprise multiple tables, it will be appreciated that the data could be stored in other types of data structures (e.g., as an object-oriented database).

The database 304 includes message data stored within a message table 306. This message data includes, for any particular message, at least message sender data, message recipient (or receiver) data, and a payload. Further details regarding information that may be included in a message, and included within the message data stored in the message table 306, are described below with reference to FIG. 4.

An entity table 308 stores entity data, and is linked (e.g., referentially) to an entity graph 310 and profile data 302. Entities for which records are maintained within the entity table 308 may include individuals, corporate entities, organizations, objects, places, events, and so forth. Regardless of entity type, any entity regarding which the interaction server system 110 stores data may be a recognized entity. Each entity is provided with a unique identifier, as well as an entity type identifier (not shown).

The entity relationship graph 310 stores information regarding relationships and associations between entities. Such relationships may be social, professional (e.g., work at a common corporation or organization), interest-based, or activity-based, merely for example. Certain relationships between entities may be unidirectional, such as a subscription by an individual user to digital content of a commercial or publishing user (e.g., a newspaper or other digital media outlet, or a brand). Other relationships may be bidirectional, such as a "friend" relationship between individual users of the interaction system 100.

Certain permissions and relationships may be attached to each relationship, and also to each direction of a relationship. For example, a bidirectional relationship (e.g., a friend relationship between individual users) may include authorization for the publication of digital content items between the individual users, but may impose certain restrictions or filters on the publication of such digital content items (e.g., based on content characteristics, location data or time of day data). Similarly, a subscription relationship between an individual user and a commercial user may impose different degrees of restrictions on the publication of digital content from the commercial user to the individual user, and may significantly restrict or block the publication of digital content from the individual user to the commercial user. A particular user, as an example of an entity, may record certain restrictions (e.g., by way of privacy settings) in a record for that entity within the entity table 308. Such privacy settings may be applied to all types of relationships within the context of the interaction system 100, or may selectively be applied to certain types of relationships.

The profile data 302 stores multiple types of profile data about a particular entity. The profile data 302 may be selectively used and presented to other users of the interaction system 100 based on privacy settings specified by a particular entity. Where the entity is an individual, the profile data 302 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the interaction system 100, and on map interfaces displayed by interaction clients 104 to other users. The collection of avatar representations may include "status avatars," which present a graphical representation of a status or activity that the user may select to communicate at a particular time.

Where the entity is a group, the profile data 302 for the group may similarly include one or more avatar representations associated with the group, in addition to the group name, members, and various settings (e.g., notifications) for the relevant group.

The database 304 also stores augmentation data, such as overlays or filters, in an augmentation table 312. The augmentation data is associated with and applied to videos (for which data is stored in a video table 314) and images (for which data is stored in an image table 316).

Filters, in some examples, are overlays that are displayed as overlaid on an image or video during presentation to a recipient user. Filters may be of various types, including user-selected filters from a set of filters presented to a sending user by the interaction client 104 when the sending user is composing a message. Other types of filters include geolocation filters (also known as geo-filters), which may be presented to a sending user based on geographic location. For example, geolocation filters specific to a neighborhood or special location may be presented within a user interface by the interaction client 104, based on geolocation information determined by a Global Positioning System (GPS) unit of the user system 102.

Another type of filter is a data filter, which may be selectively presented to a sending user by the interaction client 104 based on other inputs or information gathered by the user system 102 during the message creation process. Examples of data filters include current temperature at a specific location, a current speed at which a sending user is traveling, battery life for a user system 102, or the current time.

Other augmentation data that may be stored within the image table 316 includes augmented reality content items (e.g., corresponding to applying "lenses" or augmented reality experiences). An augmented reality content item may be a real-time special effect and sound that may be added to an image or a video.

A story table 318 stores data regarding collections of messages and associated image, video, or audio data, which are compiled into a collection (e.g., a story or a gallery). The creation of a particular collection may be initiated by a particular user (e.g., each user for which a record is maintained in the entity table 308). A user may create a "personal story" in the form of a collection of content that has been created and sent/broadcast by that user. To this end, the user interface of the interaction client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a user interface of the interaction client 104, to contribute content to a particular live story. The live story may be identified to the user by the interaction client 104, based on his or her location. The end result is a "live story" told from a community perspective.

A further type of content collection is known as a "location story," which enables a user whose user system 102 is located within a specific geographic location (e.g., on a college or university campus) to contribute to a particular collection. In some examples, a contribution to a location story may employ a second degree of authentication to verify that the end-user belongs to a specific organization or other entity (e.g., is a student on the university campus).

As mentioned above, the video table 314 stores video data that, in some examples, is associated with messages for which records are maintained within the message table 306. Similarly, the image table 316 stores image data associated with messages for which message data is stored in the entity table 308. The entity table 308 may associate various augmentations from the augmentation table 312 with various images and videos stored in the image table 316 and the video table 314.

The databases 304 also include trained machine learning (ML) technique(s) 307 that stores parameters of one or more machine learning models that have been trained during training of the sparsepose estimation system 500. For example, trained machine learning techniques 307 stores the trained parameters of one or more artificial neural network machine learning models or techniques.

Data Communications Architecture

Figure 4:
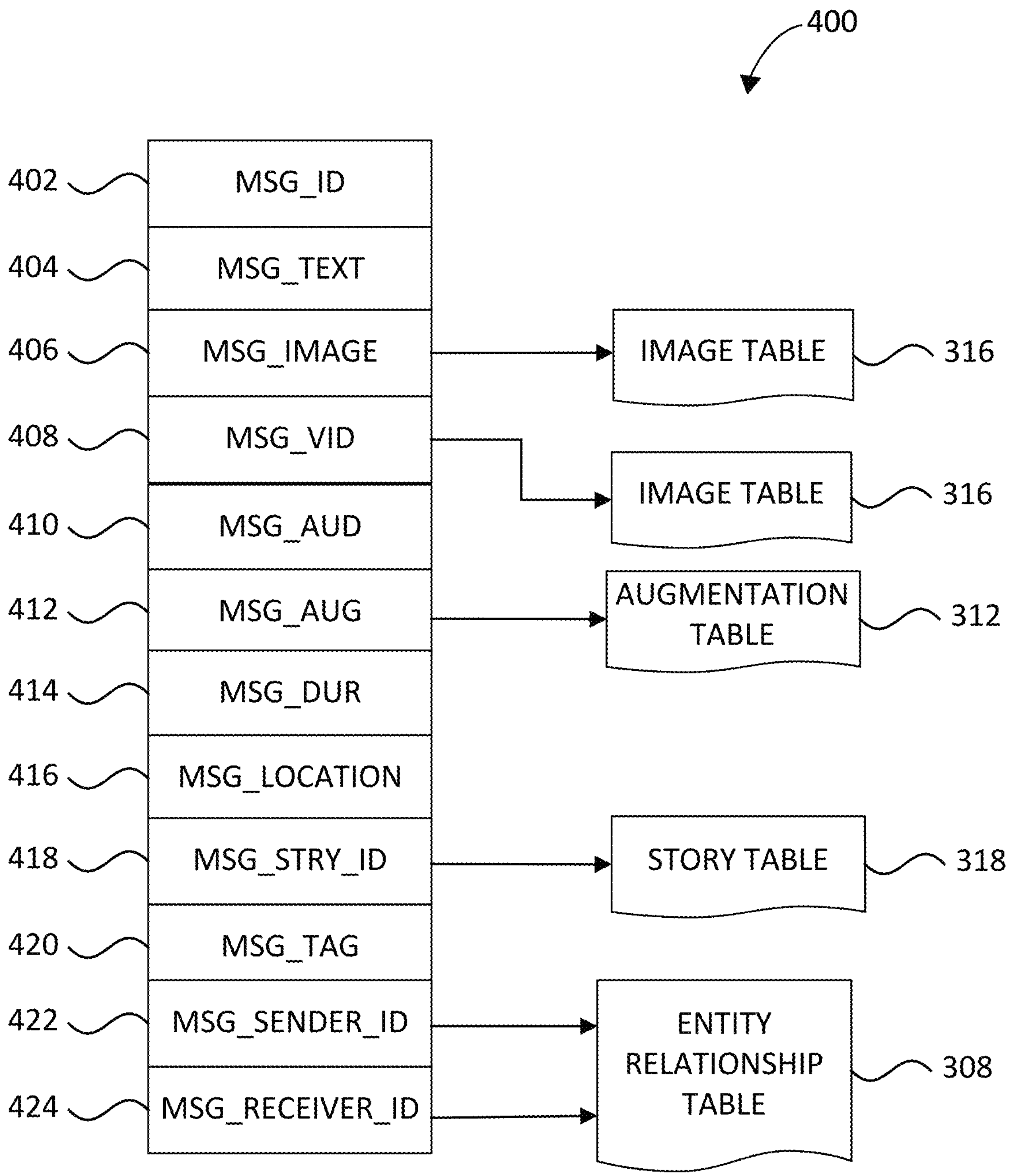
FIG. 4 is a diagrammatic representation of a message, according to some examples.

FIG. 4 is a schematic diagram illustrating a structure of a message 400, according to some examples, generated by an interaction client 104 for communication to a further interaction client 104 via the interaction servers 124. The content of a particular message 400 is used to populate the message table 306 stored within the database 304, accessible by the interaction servers 124. Similarly, the content of a message 400 is stored in memory as "in-transit" or "in-flight" data of the user system 102 or the interaction servers 124. A message 400 is shown to include the following example components:

- Message identifier 402: a unique identifier that identifies the message 400.
- Message text payload 404: text, to be generated by a user via a user interface of the user system 102, and that is included in the message 400.
- Message image payload 406: image data, captured by a camera component of a user system 102 or retrieved from a memory component of a user system 102, and that is included in the message 400. Image data for a sent or received message 400 may be stored in the image table 316.
- Message video payload 408: video data, captured by a camera component or retrieved from a memory component of the user system 102, and that is included in the message 400. Video data for a sent or received message 400 may be stored in the image table 316.
- Message audio payload 410: audio data, captured by a microphone or retrieved from a memory component of the user system 102, and that is included in the message 400.
- Message augmentation data 412: augmentation data (e.g., filters, stickers, or other annotations or enhancements) that represents augmentations to be applied to message image payload 406, message video payload 408, or message audio payload 410 of the message 400. Augmentation data for a sent or received message 400 may be stored in the augmentation table 312.
- Message duration parameter 414: parameter value indicating, in seconds, the amount of time for which content of the message (e.g., the message image payload 406, message video payload 408, message audio payload 410) is to be presented or made accessible to a user via the interaction client 104.
- Message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image within the message image payload 406, or a specific video in the message video payload 408).
- Message story identifier 418: identifier values identifying one or more content collections (e.g., "stories" identified in the story table 318) with which a particular content item in the message image payload 406 of the message 400 is associated. For example, multiple images within the message image payload 406 may each be associated with multiple content collections using identifier values.

Message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

Message sender identifier 422: an identifier (e.g., a messaging system identifier, email address, or device identifier) indicative of a user of the user system 102 on which the message 400 was generated and from which the message 400 was sent.

Message receiver identifier 424: an identifier (e.g., a messaging system identifier, email address, or device identifier) indicative of a user of the user system 102 to which the message 400 is addressed.

The contents (e.g., values) of the various components of message 400 may be pointers to locations in tables within which content data values are stored. For example, an image value in the message image payload 406 may be a pointer to (or address of) a location within an image table 316. Similarly, values within the message video payload 408 may point to data stored within an image table 316, values stored within the message augmentation data 412 may point to data stored in an augmentation table 312, values stored within the message story identifier 418 may point to data stored in a story table 318, and values stored within the message sender identifier 422 and the message receiver identifier 424 may point to user records stored within an entity table 308.

Sparsepose Estimation System

Figure 5:
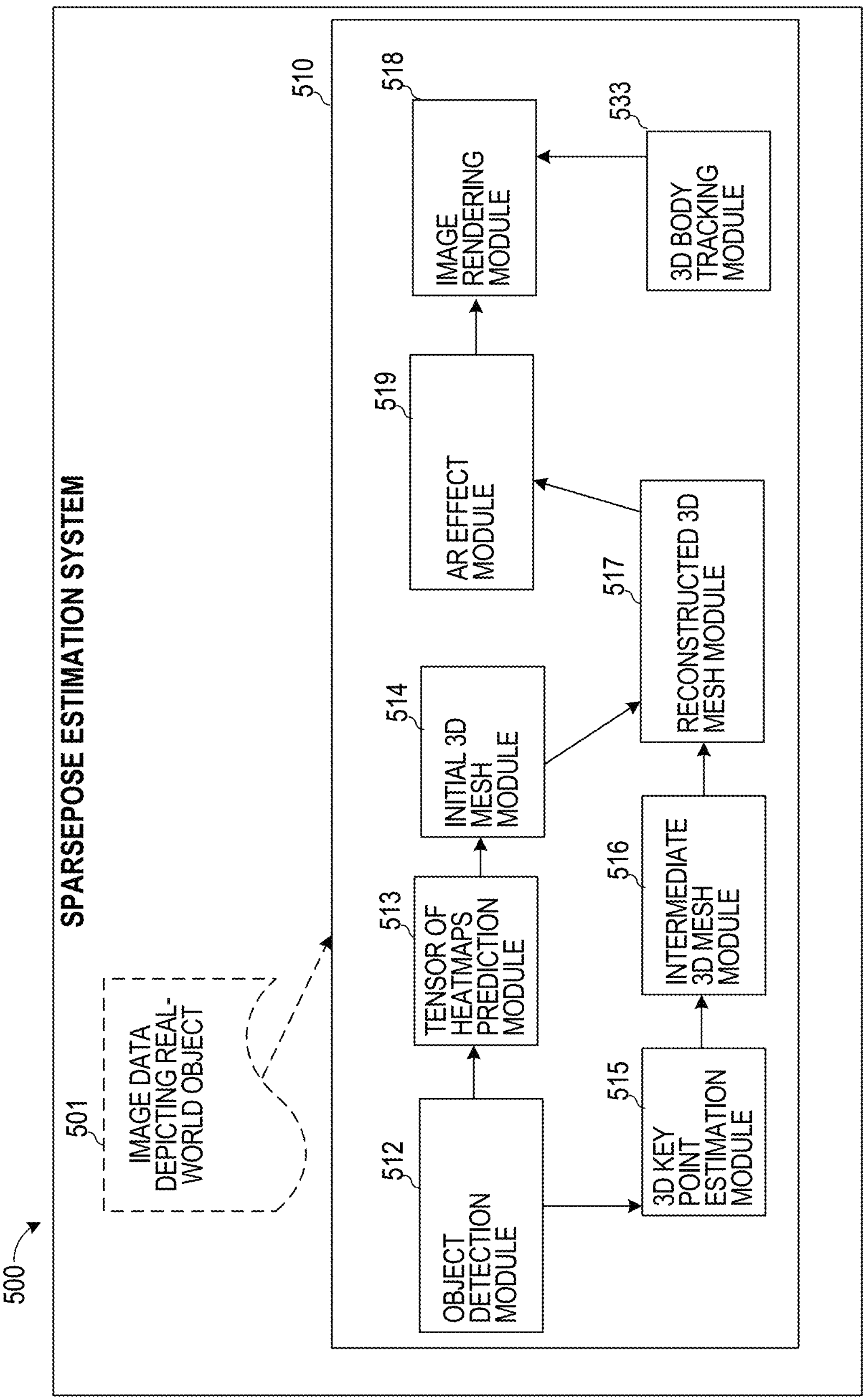
FIG. 5 is a block diagram showing an example sparsepose estimation system, according to some examples.

FIG. 5 is a block diagram showing an example sparsepose estimation system 500, according to some examples. Sparsepose estimation system 500 includes a set of components 510 that operate on a set of input data (e.g., one or more monocular images or videos depicting a real-world object, such as a person or training data, wearing a fashion item (real-world fashion item or AR fashion item)). The set of input data can be obtained from one or more database(s) (FIG. 3) during the training phases and/or can be obtained from an RGB camera of a user system 102 when an AR/VR application is being used, such as by an interaction client 104. Sparsepose estimation system 500 includes one or more machine learning models. The sparsepose estimation system 500 includes an object detection module 512, a tensor of heatmaps prediction module 513, an initial 3D mesh module 514, a 3D key point estimation module 515, an intermediate 3D mesh module 516, a reconstructed 3D mesh module 517, an AR effect module 519, an image rendering module 518, and a 3D body tracking module 533.

In some examples, the sparsepose estimation system 500 receives an image that includes a depiction of a real-world object in a real-world environment. The sparsepose estimation system 500 applies a first machine learning model to a portion of the image that depicts the real-world object to predict a tensor of heatmaps representing vertex positions of a plurality of triangles of a three-dimensional (3D) mesh corresponding to the real-world object. A first heatmap of the tensor of heatmaps represents a first group of possible coordinates for a first vertex of a first triangle of the plurality of triangles. A second heatmap of the tensor of heatmaps represents a second group of possible coordinates for a second vertex of the first triangle. The sparsepose estimation system 500 processes the tensor of heatmaps to select a subset of the tensor of heatmaps, the subset of the tensor of heatmaps including a first coordinate of the first group of possible coordinates and a second coordinate of the second group of possible coordinates. The sparsepose estimation system 500 generates the 3D mesh based on the selected subset of the tensor of heatmaps.

In some examples, the sparsepose estimation system 500 applies a second machine learning model to the image to predict a plurality of bounding boxes for each of a plurality of real-world objects depicted in the image. The sparsepose estimation system 500 selects a first bounding box from the plurality of bounding boxes to identify the portion of the image. In some examples, the tensor of heatmaps represent a sparsepose corresponding to a range of possible vertices of a densepose.

In some examples, the 3D mesh includes an initial 3D mesh. The sparsepose estimation system 500 applies a second machine learning model to the portion of the image to predict a set of 3D key points corresponding to a skeleton of the real-world object. The sparsepose estimation system 500 generates, in parallel with the initial 3D mesh, an intermediate 3D mesh using the set of 3D key points representing a per-vertex depth of the real-world object. The sparsepose estimation system 500 fuses the initial 3D mesh with the intermediate 3D mesh to form a reconstructed 3D mesh.

In some examples, the sparsepose estimation system 500 trains the first machine learning model using training data including a plurality of training images depicting training real-world objects and corresponding ground-truth denseposes and training 3D meshes corresponding to the training real-world objects, each ground-truth densepose representing coordinates of respective 3D meshes of the training real-world objects. In some examples, the sparsepose estimation system 500 trains the first machine learning model based on a plurality of losses.

In some examples, a first loss of the plurality of losses includes a cross-entropy loss. The sparsepose estimation system 500 obtains a first training image of the plurality of training images and a first ground-truth densepose corresponding to a first training real-world object depicted in the first training image. The sparsepose estimation system 500 computes barycentric coordinates of an individual triangle of a training 3D mesh corresponding to a particular pixel of the first training real-world object using the first ground-truth densepose. The sparsepose estimation system 500 applies the first machine learning model to the first training image to estimate an individual tensor of heatmaps corresponding to the first training real-world object. The sparsepose estimation system 500 generates predicted posterior coordinates using a selection of a group of coordinates of the individual tensor of heatmaps corresponding to the particular pixel of the first training real-world object. The sparsepose estimation system 500 computes a deviation including the cross-entropy loss between the predicted posterior coordinates and the barycentric coordinates and updates parameters of the first machine learning model based on the deviation.

In some examples, each heatmap of the individual tensor of heatmaps represents a respective group of possible coordinates for an individual vertex of an individual triangle of an individual mesh corresponding to the first training real-world object. The sparsepose estimation system 500 updates scores associated with the possible coordinates for the individual vertex based on the cross-entropy loss. In some examples, a second loss of the plurality of losses includes a vertex localization loss. In such cases, the sparsepose estimation system 500 integrates scores of the group of possible coordinates for each vertex of the individual mesh corresponding to the first training real-world object to generate estimated coordinates for each vertex of the individual mesh. The sparsepose estimation system 500 computes a deviation between a particular vertex of the estimated coordinates of the individual mesh and a corresponding vertex of a training 3D mesh of the first training real-world object and computes a first portion of the second loss based on the computed deviation between the particular vertex and the corresponding vertex. In some cases, the sparsepose estimation system 500 computes a first edge based on a difference between a first pair of the estimated coordinates of a particular triangle of the individual mesh and computes a second edge based on a difference between a second pair of coordinates of a corresponding triangle of the training 3D mesh. The sparsepose estimation system 500 computes a second portion of the second loss based on a deviation between the first edge and the second edge.

In some examples, a second loss of the plurality of losses includes a part segmentation loss. In such cases, the sparsepose estimation system 500 identifies a plurality of parts of the first training real-world object, each of the plurality of parts including a respective collection of triangles. The sparsepose estimation system 500 selects a particular part of the plurality of parts. The sparsepose estimation system 500 retrieves a group of coordinates of the individual tensor of heatmaps corresponding to the particular part. The sparsepose estimation system 500 computes a sum of scores associated with the retrieved group of coordinates. The sparsepose estimation system 500 compares the sum of the scores to a threshold and updates parameters of the first machine learning model based on a result of comparing the sum of the scores to the threshold to maximize the sum of the scores for the retrieved group of coordinates.

In some examples, a second loss of the plurality of losses includes a spatial consistency loss. The sparsepose estimation system 500 obtains a ground-truth pixel value of the training image for a given set of barycentric coordinates corresponding to the individual triangle of the training 3D mesh. The sparsepose estimation system 500 computes an estimated pixel value based on the predicted posterior coordinates and computes the spatial consistency loss based on a deviation between the ground-truth pixel value and the estimated pixel value.

In some examples, the sparsepose estimation system 500 applies a second machine learning model to the portion of the image to estimate offsets between vertices of the 3D mesh. In some examples, the sparsepose estimation system 500 trains the second machine learning model based on an offset loss by computing a first offset between first and second vertices of the training 3D mesh and computing a second offset between first and second vertices of an individual mesh generated using the individual tensor of heatmaps. The sparsepose estimation system 500 computes the offset loss based on a deviation between the first and second offsets.

In some examples, the second machine learning model estimates a depth of the 3D mesh. In some examples, the subset of the tensor of heatmaps represents a set of vertices of the plurality of triangles each associated with a score that transgresses a threshold score. In some examples, the sparsepose estimation system 500 displays one or more AR elements on the image based on the 3D mesh.

In some examples, the object detection module 512 receives an image or video 501 from a camera of the user system 102 or other local and/or remote device. For example, the object detection module 512 can access a real-time video feed being captured by the user system 102. The object detection module 512 can detect input or a request from the user to perform an AR operation, such as launching an AR experience. For example, the object detection module 512 can detect hand gestures of a user of the user system 102 in the real-time video feed. The hand gestures can include a pinch gesture, a snapping gesture, a pointing gesture, or any other suitable gesture. In some cases, the hand gesture taps or corresponds to (e.g., hands can be placed to overlap) a displayed option corresponding to the AR experience operations, such as to overlay one or more AR graphics on a person depicted in the image or video 501. In addition, or in the alternative, the object detection module 512 can detect speech input received from the user that includes a spoken command to perform an AR operation, such as to apply an AR fashion item to a person depicted in the image or video 501 (e.g., a shirt, pants, or the entire outfit including pants and shirt).

The object detection module 512, in response to the request to perform the AR operation, applies one or more trained machine learning models to the image or video 501. The output of the machine learning models generates bounding boxes centered on each instance of the image that depicts a particular object, such as a bounding box for each person depicted in the image or video 501. The object detection module 512 then crops the portions of the image or video 501 corresponding to each bounding box. The object detection module 512 provides the cropped portions or portion of the image or video 501 to the heatmaps prediction module 513 to predict a tensor of heatmaps for the object(s) depicted in the cropped portion. The object detection module 512 also provides the cropped portion or portions of the image or video 501 to the 3D key point estimation module 515 to predict or estimate 3D key points of the object(s) depicted in the cropped portion.

In some examples, the heatmaps prediction module 513 is trained to predict a tensor of heatmaps for an object depicted in the portion of a received image. This tensor corresponds to a sparsepose of the object depicted in the portion of the received image and can be used to generate an initial 3D mesh model by being processed by the 3D mesh module 514. Specifically, the sparsepose or tensor of heatmaps provides a score or probability of a mapping between a pixel of the object in the portion of the image and an individual vertex of a 3D mesh. Namely, the 3D mesh is constructed by a plurality of triangles each having three vertices. Each heatmap in the tensor of heatmaps is associated with a corresponding single vertex of one of the plurality of triangles and provides a probability distribution representing a likelihood that a coordinate of the single vertex maps to the pixel of an object depicted in an image map. The coordinate (e.g., X, Y) of the single vertex with the highest probability or score is the most likely vertex that lies on the 3D mesh.

In some examples, the initial 3D mesh module 514 identifies the vertices in the tensor of heat maps having a greatest value or score or probability. The initial 3D mesh module 514 then generates a 3D mesh by constructing triangles using the identified vertices. In parallel or concurrently with the initial 3D mesh module 514 processing the output of the heatmaps prediction module 513 to generate the initial 3D mesh, the intermediate 3D mesh module 516 processes the 3D key points that represent a skeleton of the object depicted in the image or video 501. The skeleton can be output by the 3D key point estimation module 515 which implements a machine learning model trained to generate or predict a skeleton. The intermediate 3D mesh module 516 generates an intermediate 3D mesh using the predicted skeleton.

In some examples, the initial 3D mesh output by the initial 3D mesh module 514 and the intermediate 3D mesh output by the intermediate 3D mesh module 516 are both provided together to the reconstructed 3D mesh module 517. The reconstructed 3D mesh module 517 fuses or combines the initial 3D mesh (generated using the sparsepose) with the intermediate 3D mesh (generated using the 3D key points) to form a final or reconstructed 3D mesh. This reconstructed 3D mesh is provided to the AR effect module 519 to use to apply one or more AR graphics corresponding to the selected AR experience.

In some examples, the AR effect module 519 retrieves one or more AR graphics and applies or overlays the one or more AR graphics on the image or video 501 using the reconstructed 3D mesh. The output of the AR effect module 519 is provided to the image rendering module 518 to display an image to a user of the user system 102 and continuously update the positioning of the one or more AR graphics using tracking information of the object depicted in the image computed by the heatmaps prediction module 513 in real time.

In some examples, the heatmaps prediction module 513 implements one or more machine learning models that are trained and supervised using a ground-truth densepose of an object depicted in a training image and based on a ground-truth or pseudo-ground-truth 3D mesh. The heatmaps prediction module 513 receives training data including a plurality of sets of training images depicting real-world objects and the corresponding ground-truth densepose of each object depicted in the training images and a ground-truth or pseudo-ground-truth 3D mesh of the respective objects. The machine learning models are trained based on a plurality of losses of different types, including a cross entropy loss (or barycentric loss), a part segmentation loss, a vertex localization loss, a spatial consistency loss, and/or an offset loss.

In training, the heatmaps prediction module 513 generates a prediction of the tensor of heatmaps of an object depicted in one or more training images. The heatmaps prediction module 513 uses one or more of the plurality of losses to compute various deviations from the supervised data (e.g., generated from the ground-truth densepose and/or ground-truth 3D mesh) and updates the parameters of the machine learning models based on the various deviations. Then, the heatmaps prediction module 513 repeats this training process on another set of training data until a stopping criterion is reached. At that point, the heatmaps prediction module 513 completes training and parameters of the machine learning models are stored and used to predict the sparsepose in real time for a new image or video that is received. The computation of the deviations based on each of these losses is discussed in turn below.

Figure 6:
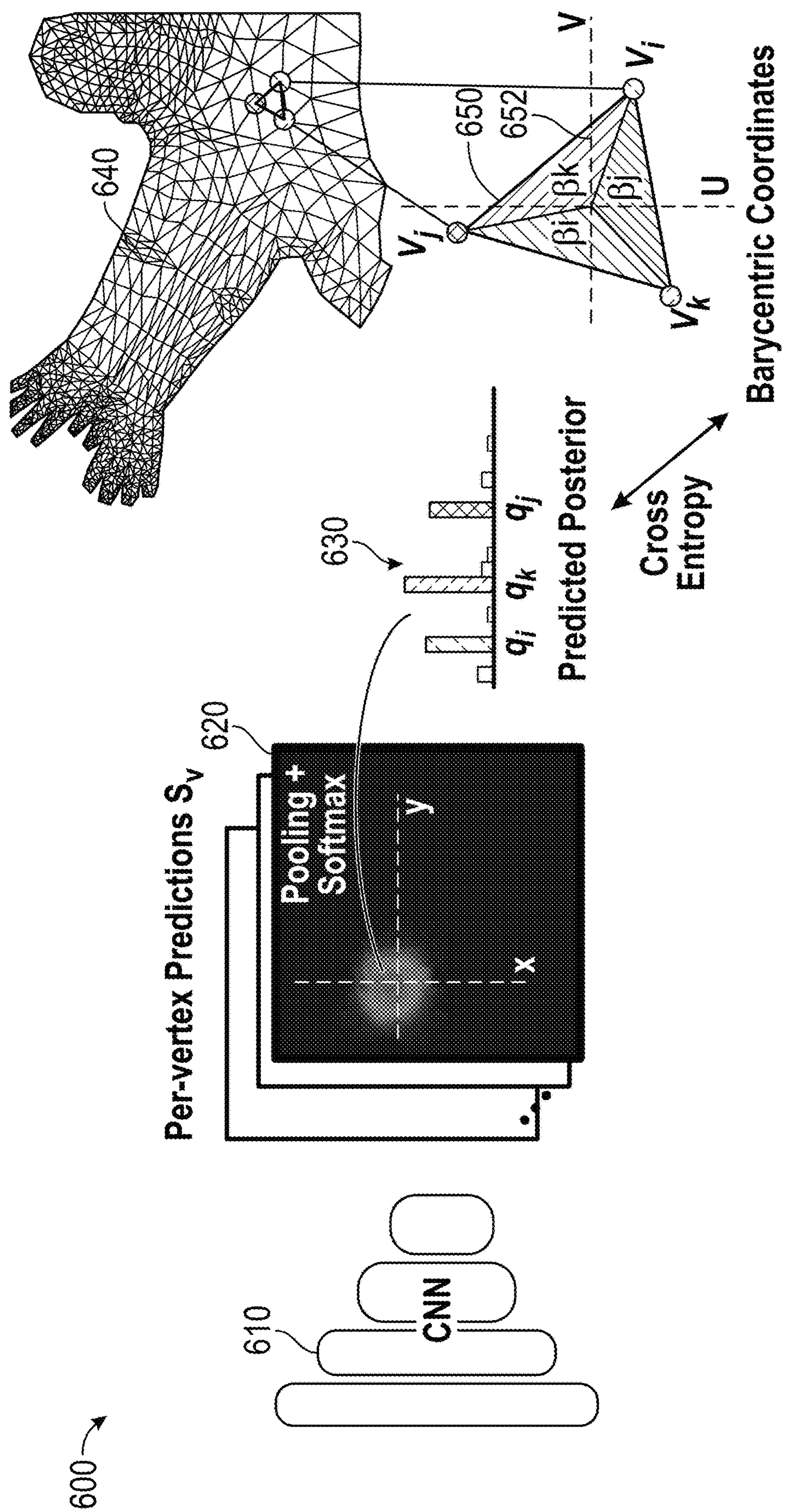
FIGS. 6-9 are diagrammatic representations of various loss computations for training a machine learning model of the sparsepose estimation system, in accordance with some examples.

FIG. 6 is a diagrammatic representation of a cross-entropy loss 600 (or barycentric loss) computation for training the machine learning model of the sparsepose estimation system 500, in accordance with some examples. Specifically, as shown in FIG. 6, a machine learning model 610 (e.g., implemented by the heatmaps prediction module 513) generates a tensor of heatmaps 620 for a first training real-world object depicted in a received image (e.g., a first training image). To compute the cross entropy loss, the heatmaps prediction module 513 obtains the first training image and a first ground-truth densepose corresponding to the first training real-world object. The heatmaps prediction module 513 computes a set of barycentric coordinates (e.g., $v_k$, $v_i$, $v_j$) of an individual triangle 650 of a training 3D mesh 640 corresponding to a particular pixel of the first training real-world object using the first ground-truth densepose. The heatmaps prediction module 513 identifies UV coordinates 652 that correspond to a center of the set of barycentric coordinates (e.g., $v_k$, $v_i$, $v_j$). The set of barycentric coordinates (e.g., $v_k$, $v_i$, $v_j$) represent a range of possible coordinates that can correspond to each vertex of the triangle 650 based on the UV coordinates 652.

The heatmaps prediction module 513 generates predicted posterior coordinates 630 using a selection of a group of coordinates of the individual tensor of heatmaps corresponding to the particular pixel of the first training real-world object. For example, the heatmaps prediction module 513 selects, for the particular pixel, a group of coordinates (X, Y) of some or all of the triangles of the 3D mesh 640. In some examples, the heatmaps prediction module 513 selects the group of coordinates for a subset of triangles that have a maximum or larger score or probability than other coordinates for the subset of triangles (e.g., a triplet of coordinates). The heatmaps prediction module 513 computes a deviation corresponding to the cross-entropy loss between the predicted posterior coordinates 630 and the corresponding barycentric coordinates (e.g., the set of barycentric coordinates (e.g., $v_k$, $v_i$, $v_j$)) of the individual triangle 650 or corresponding to the UV coordinates 652. The heatmaps prediction module 513 updates parameters of the machine learning model 610 based on the deviation.

Specifically, the cross-entropy loss translates the densepose-based annotation of a pixel x with UV coordinates u into a constraint on the sparsepose scores s=S[x1, x2, :] at that pixel. This is a task of competition among the sparsepose vertices for the occupancy of the particular pixel, implemented through a softmax-based posterior. If a vertex v landed precisely on a given pixel, the system imposes at that point a standard cross-entropy loss using the one-hot encoding of that vertex. Since the densepose ground-truth was collected randomly, in general the UV value u of any pixel will be expressed as the combination of three barycentric coordinates (βi, βj, βk) for a single triangle of the underlying mesh formed by vertices (i, j, k). These can be interpreted as a discrete distribution that is supported on the triangle vertices and can be used to penalize the softmax-based posterior using the general definition of the cross-entropy loss:

$$\mathcal{L}_{Bar-CE} = -\sum_{v} p_v \log(q_v),$$

where $$p_v = \begin{cases} \beta_v & v \in (i, j, k) \\ 0 & v \notin (i, j, k) \end{cases}$$

$$q_v = \frac{\exp(s_v)}{\sum_{k=1}^{V} \exp(s_k)}.$$

Namely, the sparsepose-based posterior q is forced to align with the barycentric-based distribution q. If there existed a direct pixel-to-vertex correspondence, this would correspond to the "one-hot" cross-entropy loss, $$\mathcal{L}_{Bar-CE} = -\log(q_v)$$

where v would be the ground-truth vertex.

Figure 7:
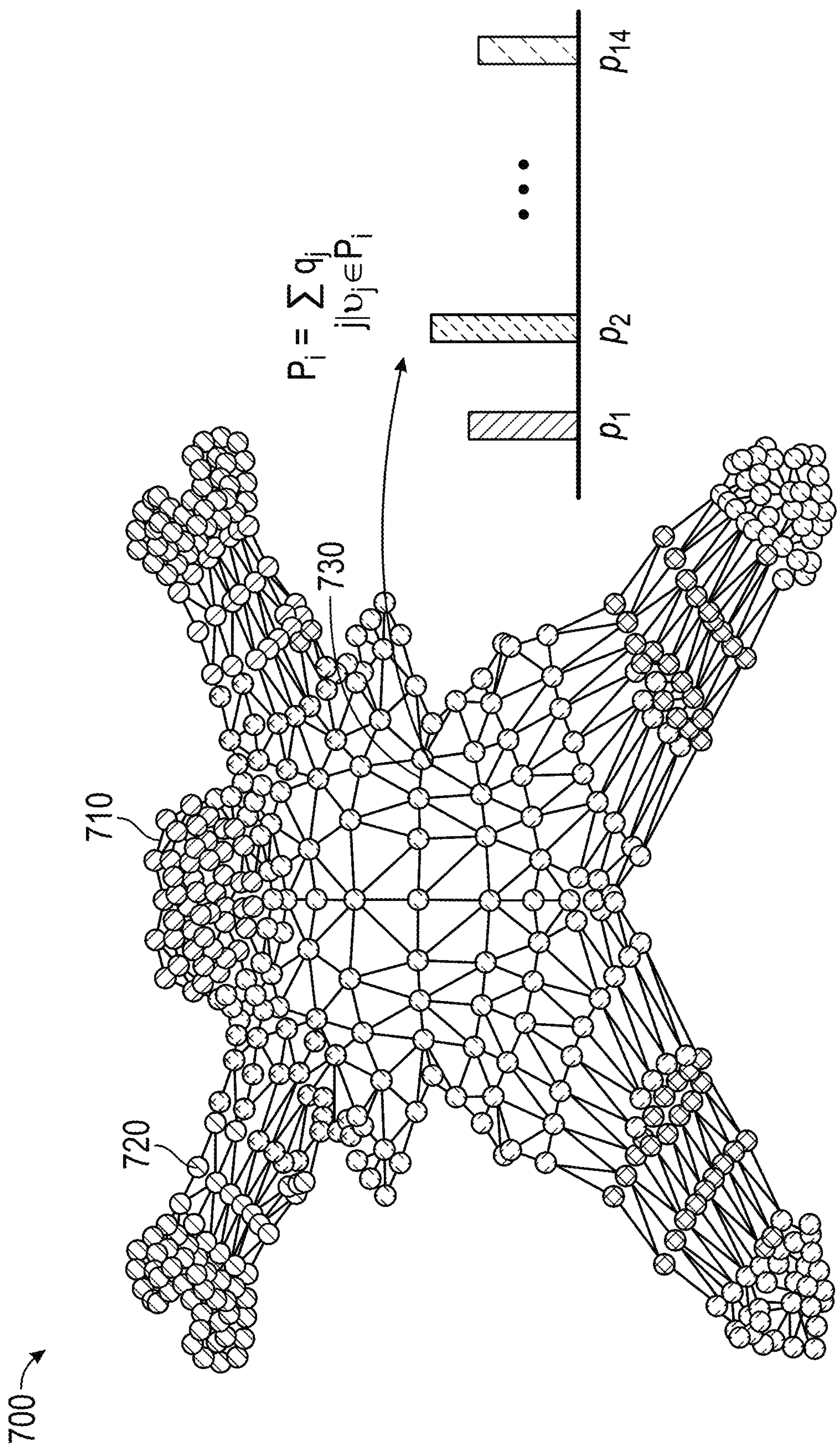

FIG. 7 is a diagrammatic representation of a part segmentation loss 700 computation for training the machine learning model of the sparsepose estimation system 500, in accordance with some examples. Specifically, as shown in FIG. 7, a mesh 710 can be divided and labeled into multiple parts, such as a head part, an arm part 720, and a body part 730. Each triangle of the mesh 710 can be assigned to a particular part. The part segmentation loss 700 computes a deviation based on whether a vertex and/or triangle associated with a particular set of vertices of the sparsepose computed by the machine learning model 610 falls within the correct part. To compute this loss, the heatmaps prediction module 513 selects a particular part of the plurality of parts and retrieves a group of coordinates of the individual tensor of heatmaps corresponding to the particular part. The heatmaps prediction module 513 computes a sum of scores or probabilities associated with the retrieved group of coordinates and compares the sum of the scores to a threshold (e.g., a maximum value, such as '1'). The heatmaps prediction module 513 updates parameters of the machine learning model 610 based on a result of comparing the sum of the scores to the threshold to maximize the sum of the scores for the retrieved group of coordinates.

Specifically, for every visible body pixel x, the part label/is known, and for every body part the set over vertices that it comprises Si are also known. Based on this information, a part-level posterior distribution can be computed in accordance with:

$$p_l = \sum_{v\in S_l} q_v,\ l \in 1, \ldots , P.$$

By collapsing the sparsepose-level softmax posterior qv this posterior distribution is supervised based on the standard cross-entropy loss obtained from the one-hot encoding of the part label.

Figure 8:
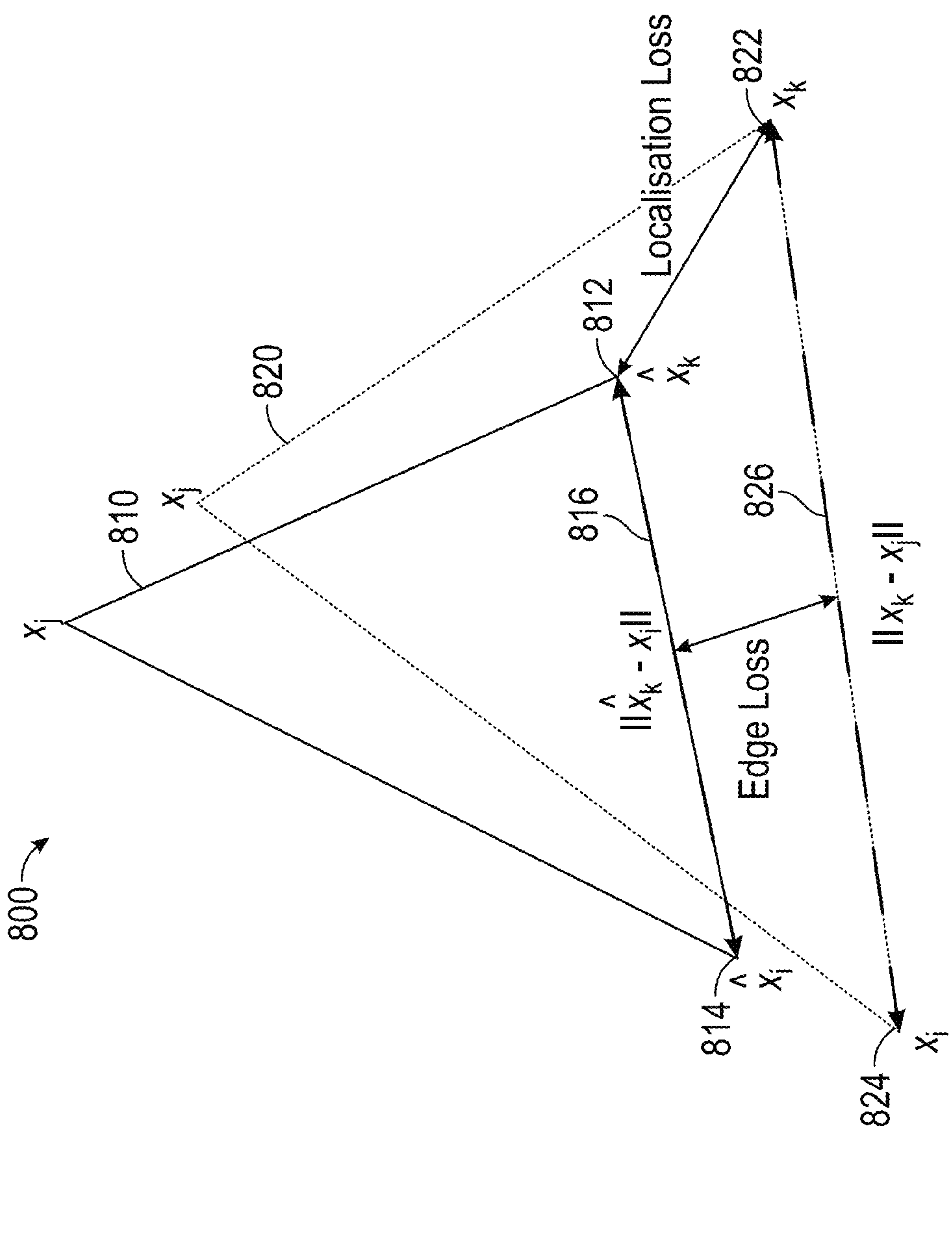

FIG. 8 is a diagrammatic representation of a vertex localization loss 800 computation for training the machine learning model of the sparsepose estimation system 500, in accordance with some examples. To compute this loss, the heatmaps prediction module 513 integrates scores of the group of possible coordinates for each vertex of the individual mesh corresponding to the first training real-world object to generate estimated coordinates for each vertex of the individual mesh. As an example, each vertex ($X_k$, $Y_k$) can be computed based on the following equation:

$$(\hat{X}_k, \hat{Y}_k) = \int_{p\in\Omega} p\cdot\hat{H}_k(p)\hat{H}_k = \frac{e^{\alpha H_k(p)}}{\int_{q\in\Omega} e^{\alpha H_k(q)}},\ \alpha > 1,$$

where $H_k$ corresponds to the tensor of heatmaps provided by the machine learning model 610.

For example, as shown in FIG. 8, a given triangle 810 is formed by a set of three adjacent vertices that correspond to the possible vertex coordinates resulting from the integration of the scores. The heatmaps prediction module 513 computes a deviation between a particular vertex coordinate 812 of the estimated coordinates of the individual mesh (e.g., the set of three adjacent vertices) and a corresponding vertex coordinate 822 of a ground-truth (training) 3D mesh of the first training real-world object. The heatmaps prediction module 513 computes a first portion of the loss 800 based on the computed deviation between the particular vertex and the corresponding vertex. Namely, the first portion of the loss 800 can be computed in accordance with:

$$\sum_{i\in V}\|x_i - \hat{x}_i\|.$$

In some examples, the heatmaps prediction module 513 computes a first edge 816 based on a difference between a first pair of the estimated coordinates 812 and 814 of a particular triangle of the individual mesh. The heatmaps prediction module 513 computes a second edge 826 based on a difference between a second pair of coordinates 822 and 824 of a corresponding triangle of the ground-truth 3D mesh. The heatmaps prediction module 513 computes a second portion of the loss 800 based on a deviation between the first edge and the second edge. Namely, the second portion of the loss 800 can be computed in accordance with:

$$\sum_{(i,j)\in\varepsilon} |(\|X_j - X_i\| - \|\hat{X}_j - \hat{X}_i\|)|.$$

Figure 9:
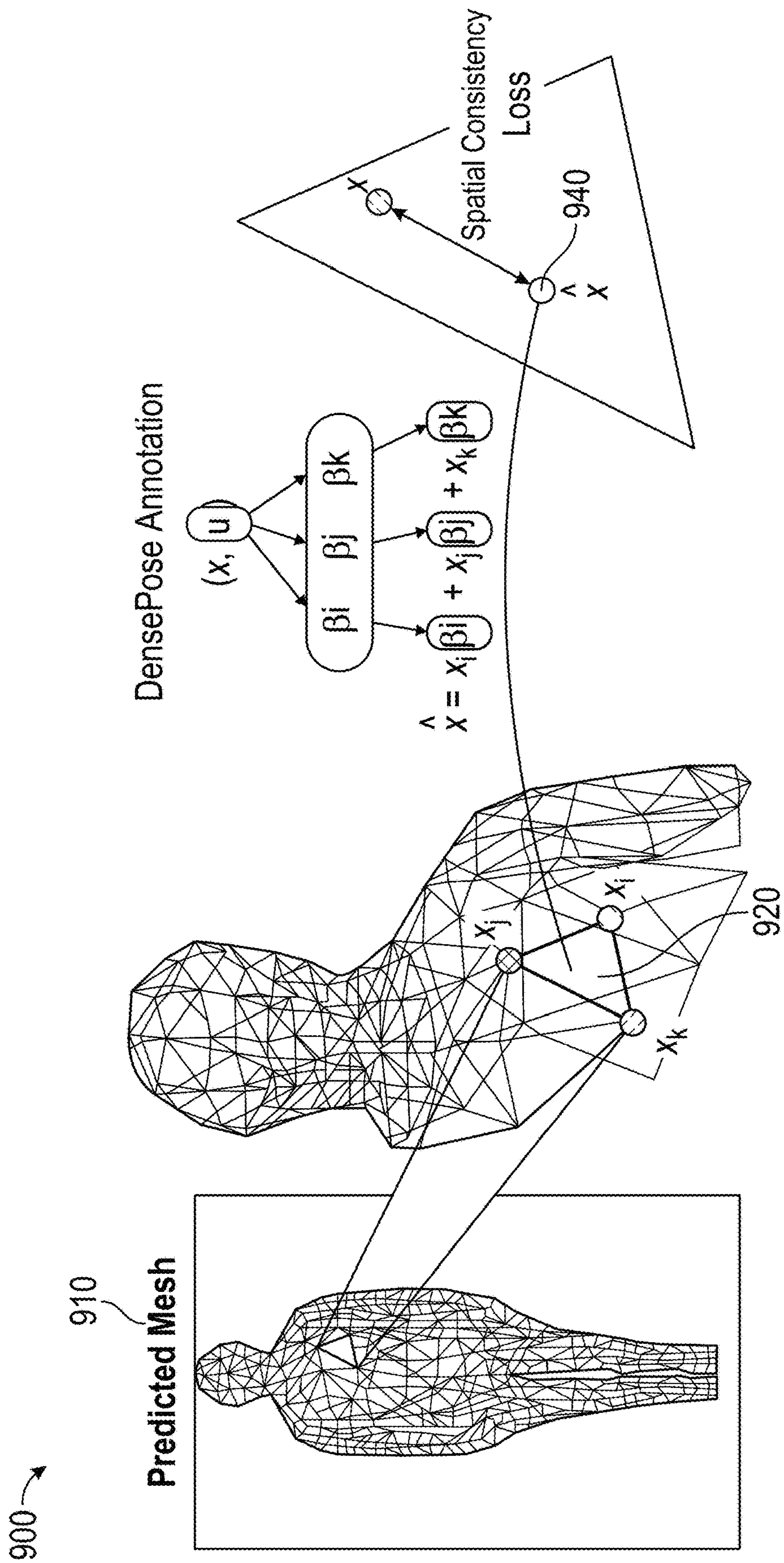

In some examples, the heatmaps prediction module 513 computes a first edge 816 based on a difference between a first pair of the estimated coordinates 812 and 814 of a particular triangle FIG. 9 is a diagrammatic representation of a spatial consistency loss 900 computation for training the machine learning model of the sparsepose estimation system 500, in accordance with some examples. To compute this loss 900, the heatmaps prediction module 513 obtains a ground-truth pixel value of the training image for a given set of barycentric coordinates corresponding to the individual triangle 920 of the ground-truth 3D mesh 910. The heatmaps prediction module 513 computes an estimated pixel value based on the predicted posterior coordinates 940 and computes the spatial consistency loss 900 based on a deviation between the ground-truth pixel value and the estimated pixel value. Specifically, this loss translates a pixel's densepose annotation (x, u) into a constraint on the sparsepose heatmaps Sv=S [:, :, v], v∈(i, j, k) of the three vertices (i, j, k) used to compute the barycentric coordinates (βi, βj, βk) of u. These three barycentric coordinates allow the heatmaps prediction module 513 to localize the pixel's corresponding point on the surface as a weighted combination of these three vertices. When projected to the image this relationship can still roughly hold. The loss equation specifies that when combining with barycentric weights the estimated 2D positions of the three vertices, the position of x should be recovered in accordance with:

$$L_{consistency} = \|x - \hat{x}\| \text{ where}$$
$$\hat{x} = \sum_{v\in(i,j,k)} \beta_v x_v,\quad x_v = \text{argsoftmax} S_v$$

Here, the heatmaps prediction module 513 obtains the 2D position xv of each vertex v as a differentiable SoftArgmax operation on the respective heatmap. Effectively this forces the heatmap to properly localize these vertices even though there lacks existence of direct annotations for them.

In some examples, the heatmaps prediction module 513 computes an offset loss. To do so, the heatmaps prediction module 513 applies another machine learning model to the portion of the image to estimate offsets between adjacent and non-adjacent vertices of the 3D mesh. The heatmaps prediction module 513 computes a first offset between first and second vertices of the ground-truth 3D mesh and computes a second offset between first and second vertices of an individual mesh generated using the individual tensor of heatmaps. The heatmaps prediction module 513 computes the offset loss based on a deviation between the first and second offsets. In some cases, this machine learning model can be used to estimate a depth of the 3D mesh.

Namely, a perspective camera model is adopted. Each vertex can lie on the ray that crosses the image plane at the sparsepose-based 2D position. The heatmaps prediction module 513 limits 3D lifting to the task of estimating the vertex depth on that ray. In some cases, the heatmaps prediction module 513 directly predicts each vertex depth. In some cases, the heatmaps prediction module 513 uses an extension of the depth prediction used in 3D pose estimation. The heatmaps prediction module 513 predicts the depth of a vertex through its depth relation to its parent skeleton joint. The vertex-joint assignments are obtained from a pre-computed part segmentation of the low-poly mesh yielding a single parent to every vertex. This allows the heatmaps prediction module 513 to treat the problems of 3D pose and 3D mesh estimation as two modular tasks that can be performed in cascade and trained through complementary datasets. Specifically, the heatmaps prediction module 513 predicts the inverse depth, which is better behaved and directly correlates with object scale. Given the estimated inverse depth of the parent joint sj and the position prediction=(x,y) for the 2D vertex projection, the heatmaps prediction module 513 predicts the inverse depth (or scale) sv of vertex v as follows: $s=s_j+S[x, y, v]$, where S is an H tensor predicting the relative depth of every vertex with respect to its parent node.

Assuming that heatmaps prediction module 513 has the focal length f, the heatmaps prediction module 513 can un-project the vertex to its 3D position as follows:

$$(X, Y, Z) = \left(\frac{f(x - c_x)}{s}, \frac{f(y - c_y)}{s}, \frac{f}{s}\right).$$

In order to supervise the depths of the individual vertices, the heatmaps prediction module 513 relies on weak supervision, since there may not exist direct mesh supervision.

Figure 10:
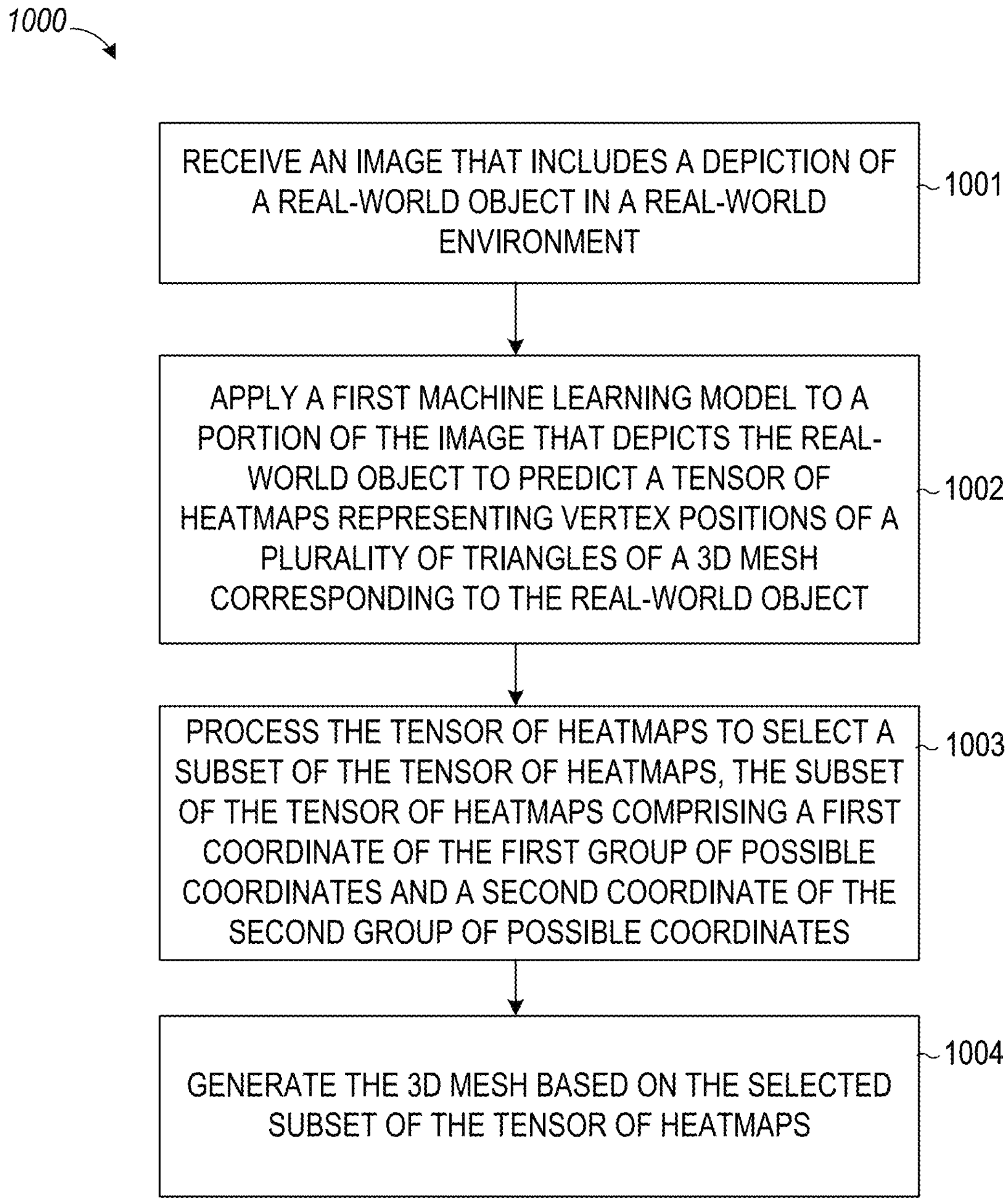
FIG. 10 is a flowchart illustrating example operations of the sparsepose estimation system, according to some examples.

FIG. 10 is a flowchart of a process 1000 performed by the sparsepose estimation system 500, in accordance with some examples. Although the flowchart can describe the operations as a sequential process, many of the operations can be performed in parallel or concurrently. In addition, the order of the operations may be re-arranged. A process is terminated when its operations are completed. A process may correspond to a method, a procedure, and the like. The steps of methods may be performed in whole or in part, may be performed in conjunction with some or all of the steps in other methods, and may be performed by any number of different systems or any portion thereof, such as a processor included in any of the systems.

At operation 1001, the sparsepose estimation system 500 (e.g., a user system 102 or a server) receives an image that includes a depiction of a real-world object in a real-world environment, as discussed above.

At operation 1002, the sparsepose estimation system 500 applies a first machine learning model to a portion of the image that depicts the real-world object to predict a tensor of heatmaps representing vertex positions of a plurality of triangles of a three-dimensional (3D) mesh corresponding to the real-world object, as discussed above. A first heatmap of the tensor of heatmaps represents a first group of possible coordinates for a first vertex of a first triangle of the plurality of triangles and a second heatmap of the tensor of heatmaps represents a second group of possible coordinates for a second vertex of the first triangle.

At operation 1003, the sparsepose estimation system 500 processes the tensor of heatmaps to select a subset of the tensor of heatmaps, the subset of the tensor of heatmaps comprising a first coordinate of the first group of possible coordinates and a second coordinate of the second group of possible coordinates, as discussed above.

At operation 1004, the sparsepose estimation system 500 generates the 3D mesh based on the selected subset of the tensor of heatmaps, as discussed above.

Machine Architecture

Figure 11:
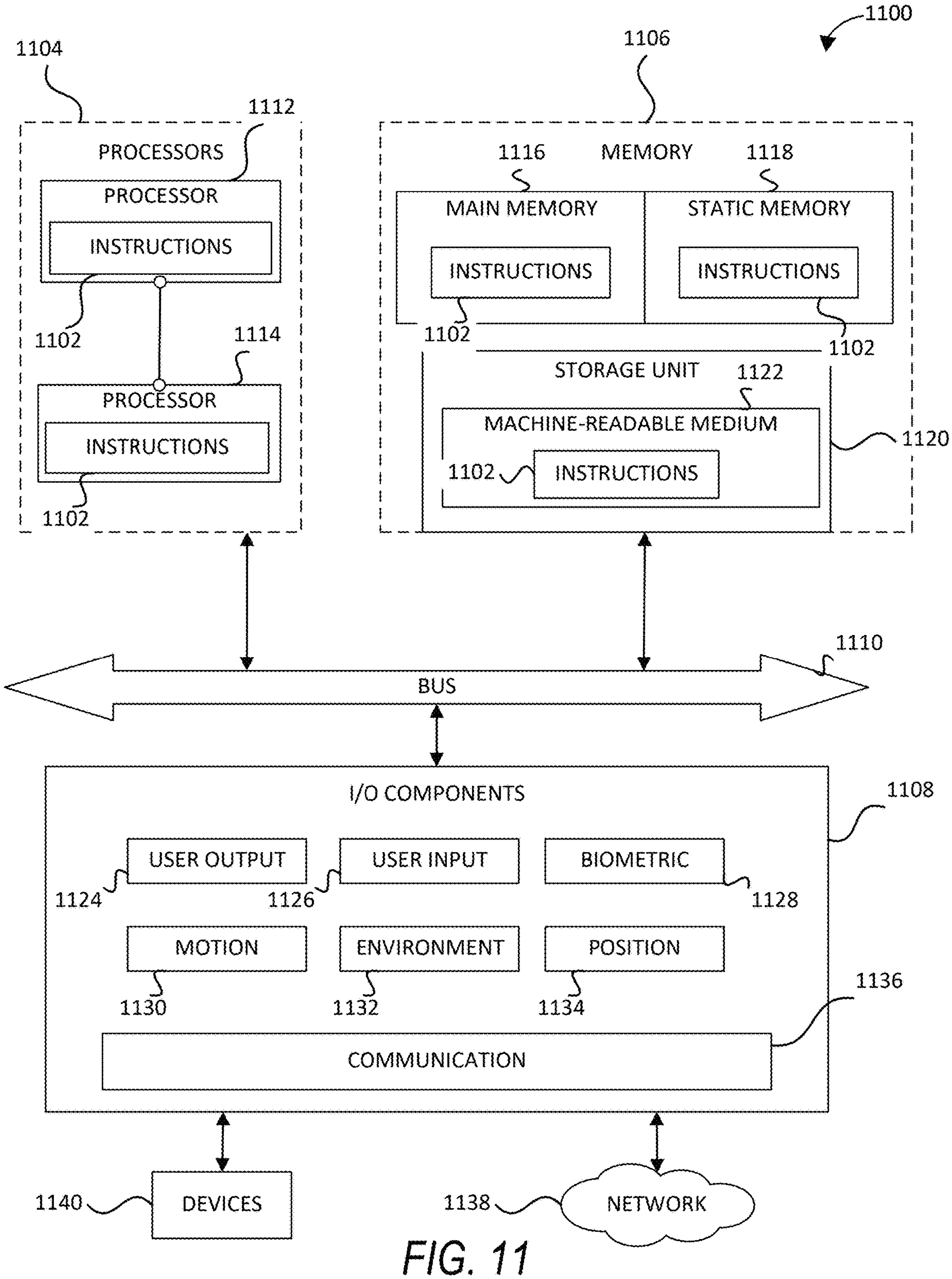
FIG. 11 is a diagrammatic representation of a machine in the form of a computer system within which a set of instructions may be executed to cause the machine to perform any one or more of the methodologies discussed herein, according to some examples.

FIG. 11 is a diagrammatic representation of the machine 1100 within which instructions 1102 (e.g., software, a program, an application, an applet, an app, or other executable code) for causing the machine 1100 to perform any one or more of the methodologies discussed herein may be executed. For example, the instructions 1102 may cause the machine 1100 to execute any one or more of the methods described herein. The instructions 1102 transform the general, non-programmed machine 1100 into a particular machine 1100 programmed to carry out the described and illustrated functions in the manner described. The machine 1100 may operate as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1102, sequentially or otherwise, that specify actions to be taken by the machine 1100. Further, while a single machine 1100 is illustrated, the term "machine" shall also be taken to include a collection of machines that individually or jointly execute the instructions 1102 to perform any one or more of the methodologies discussed herein. The machine 1100, for example, may comprise the user system 102 or any one of multiple server devices forming part of the interaction server system 110. In some examples, the machine 1100 may also comprise both client and server systems, with certain operations of a particular method or algorithm being performed on the server-side and with certain operations of the particular method or algorithm being performed on the client-side.

The machine 1100 may include processors 1104, memory 1106, and input/output I/O components 1108, which may be configured to communicate with each other via a bus 1110. In an example, the processors 1104 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1112 and a processor 1114 that execute the instructions 1102. The term "processor" is intended to include multi-core processors that may comprise two or more independent processors (sometimes referred to as "cores") that may execute instructions contemporaneously. Although FIG. 11 shows multiple processors 1104, the machine 1100 may include a single processor with a single-core, a single processor with multiple cores (e.g., a multi-core processor), multiple processors with a single core, multiple processors with multiples cores, or any combination thereof.

The memory 1106 includes a main memory 1116, a static memory 1118, and a storage unit 1120, both accessible to the processors 1104 via the bus 1110. The main memory 1106, the static memory 1118, and storage unit 1120 store the instructions 1102 embodying any one or more of the methodologies or functions described herein. The instructions 1102 may also reside, completely or partially, within the main memory 1116, within the static memory 1118, within machine-readable medium 1122 within the storage unit 1120, within at least one of the processors 1104 (e.g., within the processor's cache memory), or any suitable combination thereof, during execution thereof by the machine 1100.

The I/O components 1108 may include a wide variety of components to receive input, provide output, produce output, transmit information, exchange information, capture measurements, and so on. The specific I/O components 1108 that are included in a particular machine will depend on the type of machine. For example, portable machines such as mobile phones may include a touch input device or other such input mechanisms, while a headless server machine will likely not include such a touch input device. It will be appreciated that the I/O components 1108 may include many other components that are not shown in FIG. 11. In various examples, the I/O components 1108 may include user output components 1124 and user input components 1126. The user output components 1124 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1126 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like. Any biometric collected by the biometric components is captured and stored with user approval and deleted on user request. Further, such biometric data may be used for very limited purposes, such as identification verification. To ensure limited and authorized use of biometric information and other personally identifiable information (PII), access to this data is restricted to authorized personnel only, if at all. Any use of biometric data may strictly be limited to identification verification purposes, and the data is not shared or sold to any third party without the explicit consent of the user. In addition, appropriate technical and organizational measures are implemented to ensure the security and confidentiality of this sensitive information.

In further examples, the I/O components 1108 may include biometric components 1128, motion components 1130, environmental components 1132, or position components 1134, among a wide array of other components. For example, the biometric components 1128 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1130 include acceleration sensor components (e.g., accelerometer), gravitation sensor components, rotation sensor components (e.g., gyroscope).

The environmental components 1132 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the user system 102 may have a camera system comprising, for example, front cameras on a front surface of the user system 102 and rear cameras on a rear surface of the user system 102. The front cameras may, for example, be used to capture still images and video of a user of the user system 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the user system 102 may also include a 360° camera for capturing 360° photographs and videos.

Further, the camera system of the user system 102 may include dual rear cameras (e.g., a primary camera as well as a depth-sensing camera), or even triple, quad or penta rear camera configurations on the front and rear sides of the user system 102. These multiple cameras systems may include a wide camera, an ultra-wide camera, a telephoto camera, a macro camera, and a depth sensor, for example.

The position components 1134 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1108 further include communication components 1136 operable to couple the machine 1100 to a network 1138 or devices 1140 via respective coupling or connections. For example, the communication components 1136 may include a network interface component or another suitable device to interface with the network 1138. In further examples, the communication components 1136 may include wired communication components, wireless communication components, cellular communication components, Near Field Communication (NFC) components, Bluetooth® components (e.g., Bluetooth® Low Energy), Wi-FiR components, and other communication components to provide communication via other modalities. The devices 1140 may be another machine or any of a wide variety of peripheral devices (e.g., a peripheral device coupled via a USB).

Moreover, the communication components 1136 may detect identifiers or include components operable to detect identifiers. For example, the communication components 1136 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph™ MaxiCode, PDF417, Ultra Code, UCC RSS-2D bar code, and other optical codes), or acoustic detection components (e.g., microphones to identify tagged audio signals). In addition, a variety of information may be derived via the communication components 1136, such as location via Internet Protocol (IP) geolocation, location via Wi-Fi® signal triangulation, location via detecting an NFC beacon signal that may indicate a particular location, and so forth.

The various memories (e.g., main memory 1116, static memory 1118, and memory of the processors 1104) and storage unit 1120 may store one or more sets of instructions and data structures (e.g., software) embodying or used by any one or more of the methodologies or functions described herein. These instructions (e.g., the instructions 1102), when executed by processors 1104, cause various operations to implement the disclosed examples.

The instructions 1102 may be transmitted or received over the network 1138, using a transmission medium, via a network interface device (e.g., a network interface component included in the communication components 1136) and using any one of several well-known transfer protocols (e.g., hypertext transfer protocol (HTTP)). Similarly, the instructions 1102 may be transmitted or received using a transmission medium via a coupling (e.g., a peer-to-peer coupling) to the devices 1140.

Software Architecture

Figure 12:
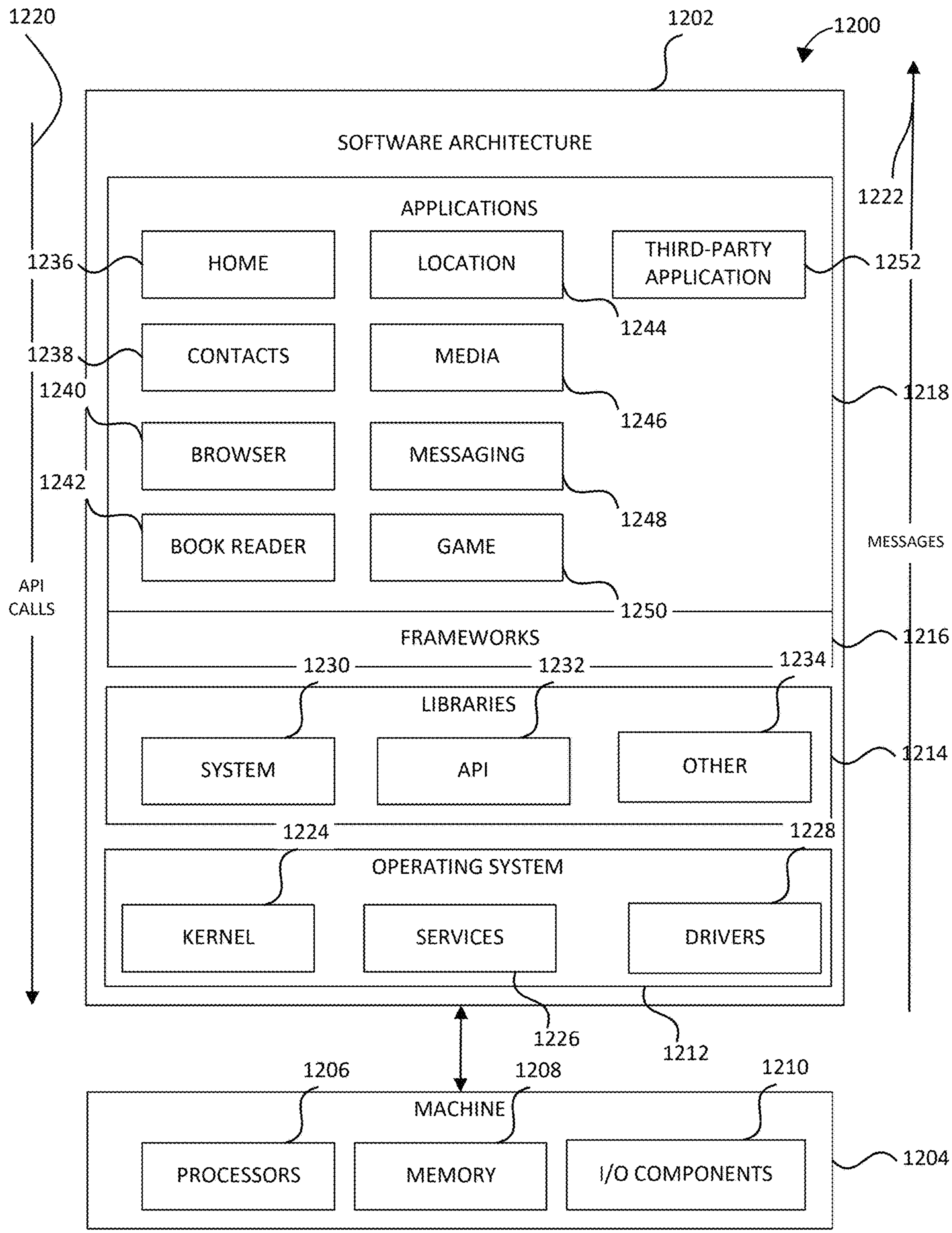
FIG. 12 is a block diagram showing a software architecture within which examples may be implemented.

FIG. 12 is a block diagram 1200 illustrating a software architecture 1202, which can be installed on any one or more of the devices described herein. The software architecture 1202 is supported by hardware such as a machine 1204 that includes processors 1206, memory 1208, and I/O components 1210. In this example, the software architecture 1202 can be conceptualized as a stack of layers, where each layer provides a particular functionality. The software architecture 1202 includes layers such as an operating system 1212, libraries 1214, frameworks 1216, and applications 1218. Operationally, the applications 1218 invoke API calls 1220 through the software stack and receive messages 1222 in response to the API calls 1220.

The operating system 1212 manages hardware resources and provides common services. The operating system 1212 includes, for example, a kernel 1224, services 1226, and drivers 1228. The kernel 1224 acts as an abstraction layer between the hardware and the other software layers. For example, the kernel 1224 provides memory management, processor management (e.g., scheduling), component management, networking, and security settings, among other functionalities. The services 1226 can provide other common services for the other software layers. The drivers 1228 are responsible for controlling or interfacing with the underlying hardware. For instance, the drivers 1228 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1214 provide a common low-level infrastructure used by the applications 1218. The libraries 1214 can include system libraries 1230 (e.g., C standard library) that provide functions such as memory allocation functions, string manipulation functions, mathematic functions, and the like. In addition, the libraries 1214 can include API libraries 1232 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1214 can also include a wide variety of other libraries 1234 to provide many other APIs to the applications 1218.

The frameworks 1216 provide a common high-level infrastructure that is used by the applications 1218. For example, the frameworks 1216 provide various graphical user interface (GUI) functions, high-level resource management, and high-level location services. The frameworks 1216 can provide a broad spectrum of other APIs that can be used by the applications 1218, some of which may be specific to a particular operating system or platform.

In an example, the applications 1218 may include a home application 1236, a contacts application 1238, a browser application 1240, a book reader application 1242, a location application 1244, a media application 1246, a messaging application 1248, a game application 1250, and a broad assortment of other applications such as a third-party application 1252. The applications 1218 are programs that execute functions defined in the programs. Various programming languages can be employed to create one or more of the applications 1218, structured in a variety of manners, such as object-oriented programming languages (e.g., Objective-C, Java, or C++) or procedural programming languages (e.g., C or assembly language). In a specific example, the third-party application 1252 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1252 can invoke the API calls 1220 provided by the operating system 1212 to facilitate functionalities described herein.

System with Head-Wearable Apparatus

Figure 13:
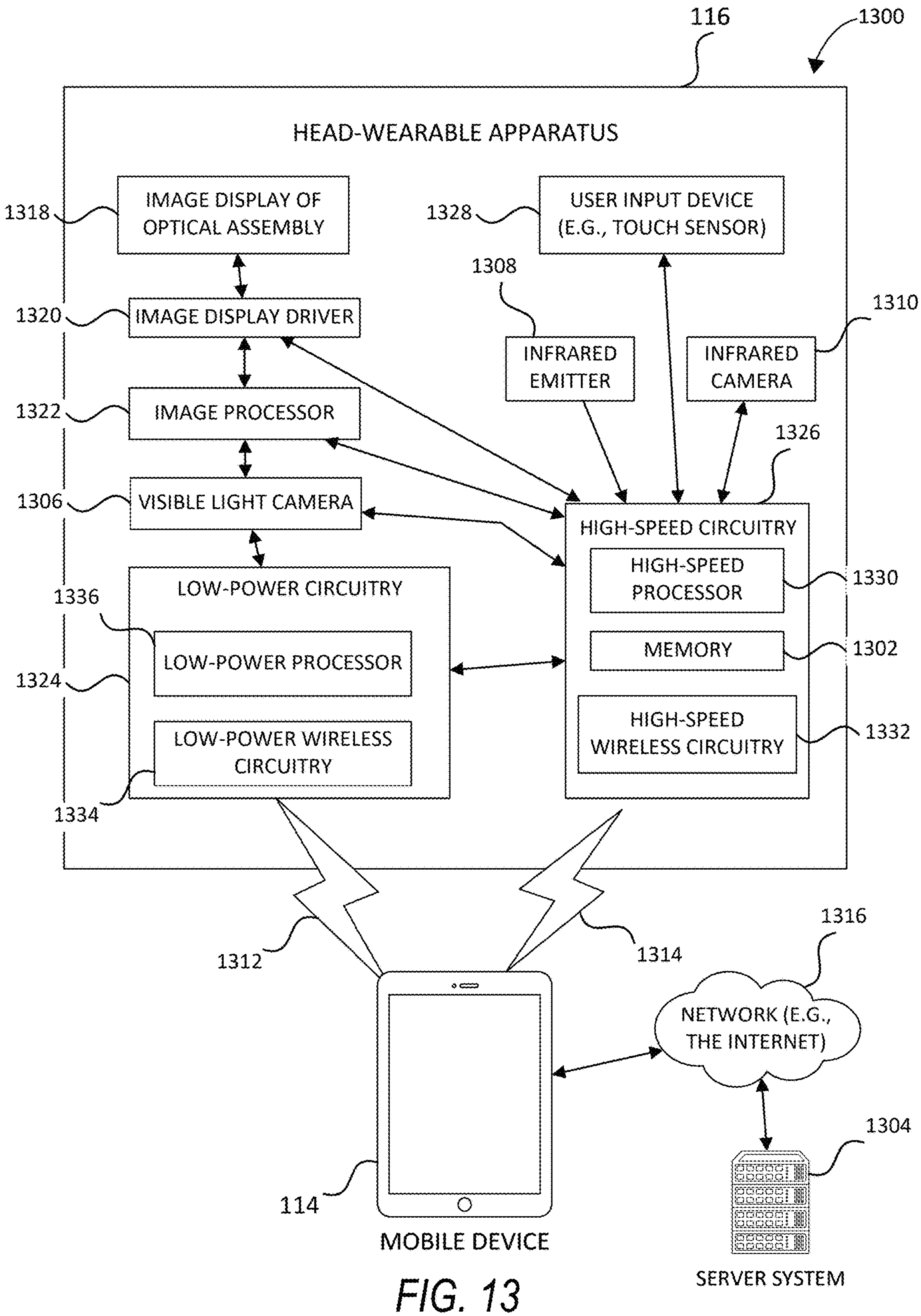
FIG. 13 illustrates a system in which a head-wearable apparatus may be implemented, according to some examples.

FIG. 13 illustrates a system 1300 including a head-wearable apparatus 116 with a selector input device, according to some examples. FIG. 13 is a high-level functional block diagram of an example head-wearable apparatus 116 communicatively coupled to a mobile device 114 and various server systems 1304 (e.g., the interaction server system 110) via various networks 108.

The head-wearable apparatus 116 includes one or more cameras, each of which may be, for example, a visible light camera 1306, an infrared emitter 1308, and an infrared camera 1310.

The mobile device 114 connects with head-wearable apparatus 116 using both a low-power wireless connection 1312 and a high-speed wireless connection 1314. The mobile device 114 is also connected to the server system 1304 and the network 1316.

The head-wearable apparatus 116 further includes two image displays of the image display of optical assembly 1318. The two image displays of optical assembly 1318 include one associated with the left lateral side and one associated with the right lateral side of the head-wearable apparatus 116. The head-wearable apparatus 116 also includes an image display driver 1320, an image processor 1322, low-power circuitry 1324, and high-speed circuitry 1326. The image display of optical assembly 1318 is for presenting images and videos, including an image that can include a graphical user interface, to a user of the head-wearable apparatus 116.

The image display driver 1320 commands and controls the image display of optical assembly 1318. The image display driver 1320 may deliver image data directly to the image display of optical assembly 1318 for presentation or may convert the image data into a signal or data format suitable for delivery to the image display device. For example, the image data may be video data formatted according to compression formats, such as H.264 (MPEG-4 Part 10), HEVC, Theora, Dirac, Real Video RV40, VP8, VP9, or the like, and still image data may be formatted according to compression formats such as Portable Network Group (PNG), Joint Photographic Experts Group (JPEG), Tagged Image File Format (TIFF) or exchangeable image file format (EXIF) or the like.

The head-wearable apparatus 116 includes a frame and stems (or temples) extending from a lateral side of the frame. The head-wearable apparatus 116 further includes a user input device 1328 (e.g., touch sensor or push button), including an input surface on the head-wearable apparatus 116. The user input device 1328 (e.g., touch sensor or push button) is to receive from the user an input selection to manipulate the graphical user interface of the presented image.

The components shown in FIG. 13 for the head-wearable apparatus 116 are located on one or more circuit boards, for example a PCB or flexible PCB, in the rims or temples. Alternatively, or additionally, the depicted components can be located in the chunks, frames, hinges, or bridge of the head-wearable apparatus 116. Left and right visible light cameras 1306 can include digital camera elements such as a complementary metal oxide-semiconductor (CMOS) image sensor, charge-coupled device, camera lenses, or any other respective visible or light-capturing elements that may be used to capture data, including images of scenes with unknown objects.

The head-wearable apparatus 116 includes a memory 1302, which stores instructions to perform a subset or all of the functions described herein. The memory 1302 can also include a storage device.

As shown in FIG. 13, the high-speed circuitry 1326 includes a high-speed processor 1330, a memory 1302, and high-speed wireless circuitry 1332. In some examples, the image display driver 1320 is coupled to the high-speed circuitry 1326 and operated by the high-speed processor 1330 in order to drive the left and right image displays of the image display of optical assembly 1318. The high-speed processor 1330 may be any processor capable of managing high-speed communications and operation of any general computing system needed for the head-wearable apparatus 136. The high-speed processor 1330 includes processing resources needed for managing high-speed data transfers on a high-speed wireless connection 1314 to a wireless local area network (WLAN) using the high-speed wireless circuitry 1332. In certain examples, the high-speed processor 1330 executes an operating system such as a LINUX operating system or other such operating system of the head-wearable apparatus 116, and the operating system is stored in the memory 1302 for execution. In addition to any other responsibilities, the high-speed processor 1330 executing a software architecture for the head-wearable apparatus 116 is used to manage data transfers with high-speed wireless circuitry 1332. In certain examples, the high-speed wireless circuitry 1332 is configured to implement Institute of Electrical and Electronic Engineers (IEEE) 802.11 communication standards, also referred to herein as WiFi. In some examples, other high-speed communications standards may be implemented by the high-speed wireless circuitry 1332.

The low-power wireless circuitry 1334 and the high-speed wireless circuitry 1332 of the head-wearable apparatus 136 can include short-range transceivers (Bluetooth™) and wireless wide, local, or wide area network transceivers (e.g., cellular or WiFi). Mobile device 114, including the transceivers communicating via the low-power wireless connection 1312 and the high-speed wireless connection 1314, may be implemented using details of the architecture of the head-wearable apparatus 116, as can other elements of the network 1316.

The memory 1302 includes any storage device capable of storing various data and applications, including, among other things, camera data generated by the left and right visible light cameras 1306, the infrared camera 1310, and the image processor 1322, as well as images generated for display by the image display driver 1320 on the image displays of the image display of optical assembly 1318. While the memory 1302 is shown as integrated with high-speed circuitry 1326, in some examples, the memory 1302 may be an independent standalone element of the head-wearable apparatus 116. In certain such examples, electrical routing lines may provide a connection through a chip that includes the high-speed processor 1330 from the image processor 1322 or the low-power processor 1336 to the memory 1302. In some examples, the high-speed processor 1330 may manage addressing of the memory 1302 such that the low-power processor 1336 will boot the high-speed processor 1330 any time that a read or write operation involving memory 1302 is needed.

As shown in FIG. 13, the low-power processor 1336 or high-speed processor 1330 of the head-wearable apparatus 136 can be coupled to the camera (visible light camera 1306, infrared emitter 1308, or infrared camera 1310), the image display driver 1320, the user input device 1328 (e.g., touch sensor or push button), and the memory 1302.

The head-wearable apparatus 116 is connected to a host computer. For example, the head-wearable apparatus 116 is paired with the mobile device 114 via the high-speed wireless connection 1314 or connected to the server system 1304 via the network 1316. The server system 1304 may be one or more computing devices as part of a service or network computing system, for example, that includes a processor, a memory, and network communication interface to communicate over the network 1316 with the mobile device 114 and the head-wearable apparatus 116.

The mobile device 114 includes a processor and a network communication interface coupled to the processor. The network communication interface allows for communication over the network 1316, low-power wireless connection 1312, or high-speed wireless connection 1314. Mobile device 114 can further store at least portions of the instructions for generating binaural audio content in the mobile device 114's memory to implement the functionality described herein.

Output components of the head-wearable apparatus 116 include visual components, such as a display such as a liquid crystal display (LCD), a plasma display panel (PDP), a light-emitting diode (LED) display, a projector, or a waveguide. The image displays of the optical assembly are driven by the image display driver 1320. The output components of the head-wearable apparatus 116 further include acoustic components (e.g., speakers), haptic components (e.g., a vibratory motor), other signal generators, and so forth. The input components of the head-wearable apparatus 116, the mobile device 114, and server system 1304, such as the user input device 1328, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

The head-wearable apparatus 136 may also include additional peripheral device elements. Such peripheral device elements may include biometric sensors, additional sensors, or display elements integrated with the head-wearable apparatus 116. For example, peripheral device elements may include any I/O components including output components, motion components, position components, or any other such elements described herein.

For example, the biometric components include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. Any biometric collected by the biometric components is captured and stored only with user approval and deleted on user request. Further, such biometric data may be used for very limited purposes, such as identification verification. To ensure limited and authorized use of biometric information and other personally identifiable information (PII), access to this data is restricted to authorized personnel only, if at all. Any use of biometric data may strictly be limited to identification verification purposes, and the data is not shared or sold to any third party without the explicit consent of the user. In addition, appropriate technical and organizational measures are implemented to ensure the security and confidentiality of this sensitive information.

The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), Wi-Fi or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over low-power wireless connections 1312 and high-speed wireless connection 1314 from the mobile device 114 via the low-power wireless circuitry 1334 or high-speed wireless circuitry 1332.

Glossary

"Carrier signal" refers, for example, to any intangible medium that is capable of storing, encoding, or carrying instructions for execution by the machine and includes digital or analog communications signals or other intangible media to facilitate communication of such instructions. Instructions may be transmitted or received over a network using a transmission medium via a network interface device.

"Client device" refers, for example, to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers, for example, to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers, for example, to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components.

A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processors. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein.

Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein.

As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers, for example, to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure. "Ephemeral message" refers, for example, to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers, for example, to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure.

The terms "machine-storage media," "computer-storage media," and "device-storage media" specifically exclude carrier waves, modulated data signals, and other such media, at least some of which are covered under the term "signal medium." "Non-transitory computer-readable storage medium" refers, for example, to a tangible medium that is capable of storing, encoding, or carrying the instructions for execution by a machine. "Signal medium" refers, for example, to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

"User device" refers, for example, to a device accessed, controlled or owned by a user and with which the user interacts perform an action, or an interaction with other users or computer systems. "Carrier signal" refers to any intangible medium that is capable of storing, encoding, or carrying instructions for execution by the machine and includes digital or analog communications signals or other intangible media to facilitate communication of such instructions. Instructions may be transmitted or received over a network using a transmission medium via a network interface device. "Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an ASIC. A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein.

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein.

Changes and modifications may be made to the disclosed examples without departing from the scope of the present disclosure. These and other changes or modifications are intended to be included within the scope of the present disclosure, as expressed in the following claims.

What is claimed is:

1. A method comprising:

receiving an image that includes a depiction of a real-world object;

predicting a tensor of two-dimensional (2D) heatmaps by applying a first machine learning model to a portion of the image, each 2D heatmap of the tensor of 2D heatmaps exclusively representing possible positions for a corresponding single vertex of an individual triangle of a plurality of triangles of a three-dimensional (3D) mesh corresponding to the real-world object, the first machine learning model trained to predict a part of the 3D mesh that is not visible within the image including at least one of occluded vertices, self-occluded vertices, or truncated vertices, a first heatmap of the tensor of heatmaps representing a first group of possible coordinates exclusively for a single first vertex of a first triangle of the plurality of triangles, a second heatmap of the tensor of heatmaps representing a second group of possible coordinates exclusively for a single second vertex of the same first triangle as the first heatmap;

selecting a subset of the tensor of heatmaps from the tensor of heatmaps, the subset of the tensor of heatmaps comprising a first coordinate of the first group of possible coordinates and a second coordinate of the second group of possible coordinates; and generating the 3D mesh based on the selected subset of the tensor of heatmaps, the 3D mesh being combined with an inpainted mesh to form a reconstructed 3D mesh.

2. The method of claim 1, further comprising:

predicting a plurality of bounding boxes for each of a plurality of real-world objects depicted in the image by applying a second machine learning model to the image; and selecting a first bounding box from the plurality of bounding boxes to identify the portion of the image.

3. The method of claim 1, wherein the tensor of heatmaps represent a sparsepose corresponding to a range of possible vertices of a densepose.

4. The method of claim 1, wherein the 3D mesh comprises an initial 3D mesh, further comprising:

predicting a set of 3D key points corresponding to a skeleton of the real-world object by applying a second machine learning model to the portion of the image;

generating, in parallel with the initial 3D mesh, an intermediate 3D mesh using the set of 3D key points representing a per-vertex depth of the real-world object;

fusing the initial 3D mesh with the intermediate 3D mesh to form a reconstructed 3D mesh, wherein generating the intermediate 3D mesh comprises predicting an inverse depth for each vertex of the intermediate 3D mesh, the inverse depth correlated with an object scale of the real-world object, wherein predicting the inverse depth for each vertex comprises computing the inverse depth of a vertex based on an estimated inverse depth of a parent skeleton joint and a per-vertex inverse-depth offset predicted by the first machine learning model; and un-projecting a vertex to a three-dimensional (3D) position using a focal length of a camera model and the predicted inverse depth.

5. The method of claim 1, further comprising training the first machine learning model using training data comprising a plurality of training images depicting real-world objects and corresponding ground-truth denseposes and training 3D meshes corresponding to the training real-world objects, each ground-truth densepose representing coordinates of respective 3D meshes of the training real-world objects, wherein training the first machine learning model comprises applying weak supervision for vertex depths when direct mesh supervision is unavailable.

6. The method of claim 5, further comprising training the first machine learning model by computing a plurality of losses.

7. The method of claim 6, wherein a first loss of the plurality of losses comprises a cross-entropy loss, further comprising:

obtaining a first training image of the plurality of training images and a first ground-truth densepose corresponding to a first training real-world object depicted in the first training image;

computing barycentric coordinates of an individual triangle of a training 3D mesh corresponding to a particular pixel of the first training real-world object using the first ground-truth densepose;

estimating an individual tensor of heatmaps corresponding to the first training real-world object by applying the first machine learning model to the first training image;

generating predicted posterior coordinates using a selection of a group of coordinates of the individual tensor of heatmaps corresponding to the particular pixel of the first training real-world object;

computing a deviation comprising the cross-entropy loss between the predicted posterior coordinates and the barycentric coordinates; and updating parameters of the first machine learning model based on the deviation.

8. The method of claim 7, wherein each heatmap of the individual tensor of heatmaps represents a respective group of possible coordinates for an individual vertex of an individual triangle of an individual mesh corresponding to the first training real-world object, further comprising updating scores associated with the respective group of possible coordinates for the individual vertex based on the cross-entropy loss.

9. The method of claim 8, wherein a second loss of the plurality of losses comprises a vertex localization loss, further comprising:

integrating scores of the group of possible coordinates for each vertex of the individual mesh corresponding to the first training real-world object to generate estimated coordinates for each vertex of the individual mesh;

computing a deviation between a particular vertex of the estimated coordinates of the individual mesh and a corresponding vertex of a training 3D mesh of the first training real-world object; and computing a first portion of the second loss based on the computed deviation between the particular vertex and the corresponding vertex.

10. The method of claim 9, further comprising:

computing a first edge based on a difference between a first pair of the estimated coordinates of a particular triangle of the individual mesh;

computing a second edge based on a difference between a second pair of coordinates of a corresponding triangle of the training 3D mesh; and computing a second portion of the second loss based on a deviation between the first edge and the second edge.

11. The method of claim 7, wherein a second loss of the plurality of losses comprises a part segmentation loss, further comprising:

identifying a plurality of parts of the first training real-world object, each of the plurality of parts comprising a respective collection of triangles;

selecting a particular part of the plurality of parts;

retrieving a group of coordinates of the individual tensor of heatmaps corresponding to the particular part;

computing a sum of scores associated with the retrieved group of coordinates;

comparing the sum of the scores to a threshold; and updating parameters of the first machine learning model based on a result of comparing the sum of the scores to the threshold to maximize the sum of the scores for the retrieved group of coordinates.

12. The method of claim 7, wherein a second loss of the plurality of losses comprises a spatial consistency loss, further comprising:

obtaining a ground-truth pixel value of the first training image for a given set of barycentric coordinates corresponding to the individual triangle of the training 3D mesh;

computing an estimated pixel value based on the predicted posterior coordinates; and computing the spatial consistency loss based on a deviation between the ground-truth pixel value and the estimated pixel value.

13. The method of claim 7, further comprising:

applying a second machine learning model to the portion of the image to estimate offsets between vertices of the 3D mesh.

14. The method of claim 13, further comprising training the second machine learning model based on an offset loss by:

computing a first offset between first and second vertices of the training 3D mesh;

computing a second offset between first and second vertices of an individual mesh generated using the individual tensor of heatmaps; and computing the offset loss based on a deviation between the first and second offsets.

15. The method of claim 13, wherein the second machine learning model estimates a depth of the 3D mesh.

16. The method of claim 1, wherein the subset of the tensor of heatmaps represents a set of vertices of the plurality of triangles each associated with a score that transgresses a threshold score, further comprising:

predicting a continuous UV field in an interior of the first triangle by interpolating between 2D vertex positions of the first triangle using barycentric coordinates, wherein the continuous UV field comprises a weighted combination of vertex UV values.

17. The method of claim 1, wherein generating the 3D mesh comprises:

adopting a perspective camera model where each vertex of the 3D mesh lies on a ray crossing an image plane at a two-dimensional (2D) position predicted from the tensor of 2D heatmaps; and estimating a depth of each vertex along the ray.

18. A system comprising:

at least one processor; and at least one memory component having instructions stored thereon that, when executed by the at least one processor, cause the at least one processor to perform operations comprising:

receiving an image that includes a depiction of a real-world object;

predicting a tensor of two-dimensional (2D) heatmaps by applying a first machine learning model to a portion of the image, each 2D heatmap of the tensor of 2D heatmaps exclusively representing possible positions for a corresponding single vertex of an individual triangle of a plurality of triangles of a three-dimensional (3D) mesh corresponding to the real-world object, the first machine learning model trained to predict a part of the 3D mesh that is not visible within the image including at least one of occluded vertices, self-occluded vertices, or truncated vertices, a first heatmap of the tensor of heatmaps representing a first group of possible coordinates exclusively for a single first vertex of a first triangle of the plurality of triangles, a second heatmap of the tensor of heatmaps representing a second group of possible coordinates exclusively for a single second vertex of the same first triangle as the first heatmap;

selecting a subset of the tensor of heatmaps from the tensor of heatmaps, the subset of the tensor of heatmaps comprising a first coordinate of the first group of possible coordinates and a second coordinate of the second group of possible coordinates; and generating the 3D mesh based on the selected subset of the tensor of heatmaps, the 3D mesh being combined with an inpainted mesh to form a reconstructed 3D mesh.

19. The system of claim 18, the operations further comprising:

localizing vertices of the 3D mesh in two dimensions by applying a differentiable soft-argmax operation to the tensor of 2D heatmaps to obtain a two-dimensional (2D) position for each vertex.

20. A non-transitory computer-readable storage medium having stored thereon instructions that, when executed by at least one processor, cause the at least one processor to perform operations comprising:

receiving an image that includes a depiction of a real-world object;

predicting a tensor of two-dimensional (2D) heatmaps by applying a first machine learning model to a portion of the image, each 2D heatmap of the tensor of 2D heatmaps exclusively representing possible positions for a corresponding single vertex of an individual triangle of a plurality of triangles of a three-dimensional (3D) mesh corresponding to the real-world object, the first machine learning model trained to predict a part of the 3D mesh that is not visible within the image including at least one of occluded vertices, self-occluded vertices, or truncated vertices, a first heatmap of the tensor of heatmaps representing a first group of possible coordinates exclusively for a single first vertex of a first triangle of the plurality of triangles, a second heatmap of the tensor of heatmaps representing a second group of possible coordinates exclusively for a single second vertex of the same first triangle as the first heatmap;

selecting a subset of the tensor of heatmaps from the tensor of heatmaps, the subset of the tensor of heatmaps comprising a first coordinate of the first group of possible coordinates and a second coordinate of the second group of possible coordinates; and generating the 3D mesh based on the selected subset of the tensor of heatmaps, the 3D mesh being combined with an inpainted mesh to form a reconstructed 3D mesh.

* * * * *